(12) United States Patent
Osada et al.

(10) Patent No.: US 8,642,194 B2
(45) Date of Patent: Feb. 4, 2014

(54) FUEL CELL SYSTEM

(75) Inventors: Yasuhiro Osada, Nagoya (JP); Tetsuya Bono, Aichi-ken (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 870 days.

(21) Appl. No.: 12/523,939

(22) PCT Filed: Mar. 7, 2008

(86) PCT No.: PCT/JP2008/054686
§ 371 (c)(1),
(2), (4) Date: Jul. 21, 2009

(87) PCT Pub. No.: WO2008/111659
PCT Pub. Date: Sep. 18, 2008

(65) Prior Publication Data
US 2010/0021783 A1 Jan. 28, 2010

(30) Foreign Application Priority Data
Mar. 9, 2007 (JP) .................. 2007-059709

(51) Int. Cl.
*H01M 8/04* (2006.01)

(52) U.S. Cl.
USPC .......................................... 429/25

(58) Field of Classification Search
None
See application file for complete search history.

(56) References Cited

U.S. PATENT DOCUMENTS

| 7,040,596 | B2 | 5/2006 | Sonoda et al. |
|---|---|---|---|
| 7,441,560 | B2 | 10/2008 | Sonoda et al. |
| 7,481,412 | B2 | 1/2009 | Ishikawa et al. |
| 2005/0118475 | A1 | 6/2005 | Ueda et al. |
| 2006/0151734 | A1* | 7/2006 | Sonoda et al. ........... 251/129.15 |

FOREIGN PATENT DOCUMENTS

| JP | 6-185663 A | 7/1994 |
|---|---|---|
| JP | 8-075032 A | 3/1996 |
| JP | 10-252804 A | 9/1998 |
| JP | 2000-003717 A | 1/2000 |
| JP | 2004-179118 A | 6/2004 |
| JP | 2004-199977 A | 7/2004 |
| JP | 2005-150090 A | 6/2005 |
| JP | 2005-347185 A | 12/2005 |
| JP | 2005-353305 A | 12/2005 |

(Continued)

OTHER PUBLICATIONS

Office Action issued May 27, 2011 in Korean Patent Application No. 10-2009-7018758 and English translation thereof.

(Continued)

*Primary Examiner* — Monica Huson
(74) *Attorney, Agent, or Firm* — Kenyon & Kenyon LLP

(57) ABSTRACT

A fuel cell system has an inlet shutoff valve provided in a main route forming an oxidized gas supply flow path, a humidifier bypass valve provided in a humidifier bypass route which is a route bypassing the main route, a fuel cell bypass valve provided in a fuel cell bypass route bypassing a fuel cell stack, and fuel cell bypass valve controlling unit. Under abnormal conditions in which one of the inlet shutoff valve and the humidifier bypass valve does not function even if the pressure in a valve opening pressure chamber of the one of the valves is at a first pressure value, the fuel cell bypass valve controlling unit restrict the opening of the fuel cell bypass valve to increase the pressure in the valve opening pressure chamber.

5 Claims, 10 Drawing Sheets

(56) References Cited

FOREIGN PATENT DOCUMENTS

| | | |
|---|---|---|
| JP | 2006-024469 A | 1/2006 |
| JP | 2006-153222 A | 6/2006 |
| JP | 2006-302612 A | 11/2006 |
| JP | 2008-021485 A | 1/2008 |
| WO | WO 2008/069083 A1 | 6/2008 |

OTHER PUBLICATIONS

Office Action issued Jul. 25, 2011 in Chinese Patent Application No. 2011072000633710 and English translation thereof.

Office Action issued Aug. 16, 2011 in Japanese Patent Application No. 2007-059709 and English translation thereof.

* cited by examiner

FUEL CELL SYSTEM

This is a 371 national phase application of PCT/JP2008/054686 filed 7 Mar. 2008, claiming priority to Japanese Patent Application No. JP 2007-059709 filed 9 Mar. 2007, the contents of which are incorporated herein by reference.

TECHNICAL FIELD

The present invention generally relates to a fuel cell system including a fuel cell which generates electric power through an electrochemical reaction of a fuel gas and an oxidized gas.

TECHNICAL BACKGROUND

A fuel cell system includes fuel cells which generate electric power through an electrochemical reaction of a reactant gas (fuel gas and an oxidized gas), a reactant gas supply flow path for supplying the reactant gas to the fuel cells, and a reactant gas related exhaust flow path for exhausting the reactant gas from the fuel cells. Additionally, the provision of fuel cell shutoff valves in the reactant gas and reactant gas related exhaust flow paths has been considered.

For example, the fuel cell system described in Japanese Patent Laid-Open Publication No. 2000-3717 (Patent Document 1) supplies air through an accumulator to a shutoff valve provided in a reactant gas related exhaust flow path for exhausting reactant gas related gas from a cell stack, to a three-way changeover valve provided in a fuel gas supply flow path for supplying fuel gas to the cell stack, and to a valve provided in an oxidized gas related supply flow path for supplying air to the cell stack to switch the respective valves as pilot valves.

Further, in the fuel cell system described in Japanese Patent Laid-Open Publication No. 2005-347185 (Patent Document 2), a flow path route for supplying fuel gas to a fuel cell stack is provided with a valve which is closed by a pressure difference of the flow path in front of and behind the valve, and when a pressure difference between a first pressure between the valve and the fuel cell stack at a first instance, and a second pressure between the valve and the fuel cell stack in a second instance are less than a predetermined value, it is determined that an opening failure occurs to the valve. When it is determined that the opening failure occurs to the valve, a fuel in the fuel cell stack is consumed, so that the differential pressure is made to occur in the flow path in front of and behind the valve.

In the case of the fuel cell system described in the above-described Patent Document 1, there is a possibility that the shutoff valve provided in the reactant gas system exhaust flow path, the three-way changeover valve provided in the fuel gas supply flow path, or the valve provided in the oxidized gas related supply flow path may not function even when the pressure at the pressure value for normally driving the valves acts on the pressure chambers of the valves because the valve member peripheral portions can become frozen when used in a low temperature environment, such as in below-zero temperatures, or the valve members can be caught by fixed portions because the shafts of the valve members incline with respect to the slide portions. When the valves do not function and do not normally open, the optimal supply of gas to the cell stack and of discharge gas from the cell stack are impaired, and, in an extreme case, there is a possibility that automatic stopping of the operation of the fuel cell system could be triggered.

In contrast to this, in the case of the fuel cell system described in Document 2, a valve which is closed by the pressure difference in the flow path in front of and behind the valve is provided in the flow path route. Further, when it is determined that an opening failure occurs to the valve, the fuel in the fuel cell stack is consumed which increases the differential pressure between the flow path in front of and behind the valve. Because in such a fuel cell system it is necessary to consume the fuel in the fuel cell stack in order to open the valve when an opening failure occurs to the valve, there is a desire for further improvement from the aspect of effective use of the generated electric power of the fuel cell stack.

DISCLOSURE OF THE INVENTION

The present invention advantageously enables more effective use of generated electric power of a fuel cell, and enables stable operation by enabling release of a stuck valve in a fuel cell system.

A fuel cell system according to the present invention includes a fuel cell generating electric power through an electrochemical reaction of an oxidized gas and a fuel gas, a valve functioning in accordance with pressure change of a fluid supplied from a fluid supply section, pressure applying unit driving the valve by causing pressure at a first pressure value to act on a pressure chamber communicating with the fluid supply section, and pressure changing unit changing the pressure at the first pressure value in the pressure chamber under abnormal conditions in which the valve does not function even when the pressure inside the pressure chamber is at the first pressure value. Driving the valve here includes the case of driving the valve to change from valve to change from valve opening to valve closing, and from valve closing to valve opening.

Further, preferably, the fuel cell system includes an oxidized gas supply flow path supplying the oxidized gas to the fuel cell, an oxidized gas related exhaust flow path exhausting the oxidized gas related gas from the fuel cell, a fuel cell bypass flow path connecting the oxidized gas supply flow path and the oxidized gas related exhaust flow path and bypassing the fuel cell, and a fuel cell bypass valve provided in the fuel cell bypass flow path, and the pressure changing unit open the fuel cell bypass valve by a predetermined amount at a starting time, and increase a pressure value of a fluid to be supplied to the pressure chamber to be larger than the first pressure value by restricting an opening of the fuel cell bypass valve under abnormal conditions in which the valve does not function even when the pressure inside the pressure chamber is at the first pressure value.

Further, in the fuel cell system according to the present invention, the pressure changing unit are preferably fluid supply section controlling unit that increase the supply pressure of the fluid to be supplied to the pressure chamber by the fluid supply section to a pressure greater than the first pressure value.

Further, in the fuel cell system according to the present invention, an oxidized gas supply flow path supplying the oxidized gas to the fuel cell, an oxidized gas related exhaust flow path exhausting the oxidized gas related gas from the fuel cell, a fuel cell bypass flow path connecting the oxidized gas supply flow path and the oxidized gas related exhaust flow path and bypassing the fuel cell, and a fuel cell bypass valve provided in the fuel cell bypass flow path are preferably included, and the pressure changing unit are preferably fluid supply section fuel cell bypass valve controlling unit that open the fuel cell bypass valve by a predetermined amount at a starting time, restrict an opening of the fuel cell bypass valve, and increase a discharge flow rate of a fluid by the fluid supply section when abnormal conditions in which the valve does not function even when the pressure inside the pressure chamber is at the first pressure value.

Further, in the fuel cell system according to the present invention, the pressure changing unit preferably alternately raise and lower the pressure in the pressure chamber under abnormal conditions in which the valve does not function even when the pressure inside the pressure chamber is at the first pressure value.

Further, more preferably, the pressure changing unit are fluid supply section controlling unit that alternately increased and decrease the supply pressure of a fluid to be supplied to the pressure chamber by the fluid supply section.

Further, in the fuel cell system according to the present invention, in the configuration in which the pressure changing unit alternately raise and lower the pressure inside the pressure chamber under abnormal conditions in which the valve does not function even when the pressure inside the pressure chamber is at the first pressure value, an oxidized gas supply flow path supplying the oxidized gas to the fuel cell, an oxidized gas related exhaust flow path exhausting the oxidized gas related gas from the fuel cell, a fuel cell bypass flow path connecting the oxidized gas supply flow path and the oxidized gas related exhaust flow path and bypassing the fuel cell, and a fuel cell bypass valve provided in the fuel cell bypass flow path are more preferably included, and the pressure changing unit are more preferably fuel cell bypass valve controlling unit that alternately increase and decrease the opening of the fuel cell bypass valve.

A fuel cell system according to the present invention comprises a valve which functions in accordance with pressure change of the fluid supplied from the fluid supply section, pressure applying unit which drive the valve by causing the pressure at the first pressure value to act on the pressure chamber communicating with the fluid supply section, and pressure changing unit which change the pressure at the first pressure value inside the pressure chamber under abnormal conditions in which the valve does not function, even when the pressure inside the pressure chamber is at the first pressure value. Therefore, even when the valve is stuck, the valve can be released by changing the pressure at the first pressure value inside the pressure chamber communicating with the fluid supply section to rise or the like using the fuel cell bypass valve or the fluid supply section controlling unit, and stable operation can be performed. In addition, as there is no need to consume the fuel inside the fuel cell in order to drive the valve, and generated electric power of the fuel cell can be used more effectively.

Further, by employing configuration in which the pressure changing unit raise and lower the pressure inside the pressure chamber under abnormal conditions in which the valve does not function even when the pressure inside the pressure chamber is at the first pressure value, even when the valve is stuck because the shaft of the valve member is stuck because it is tilted with respect to the slide portion, and the valve does not function even when a pressure value which normally drives the valve is applied, a varied force can be applied alternately to each side in the axial, to free the stuck valve and enable its operation.

DESCRIPTION OF SYMBOLS

10 FUEL CELL SYSTEM, 12 FUEL CELL STACK, 14 OXIDIZED GAS SUPPLY FLOW PATH, 16 OXIDIZED GAS RELATED EXHAUST FLOW PATH, 18 HUMIDIFIER BYPASS VALVE, 20 INLET SHUTOFF VALVE, 22 OUTLET SHUTOFF VALVE, 24 AIR COMPRESSOR, 26 INTER COOLER, 28 HUMIDIFIER, 30 MAIN ROUTE, 32 HUMIDIFIER BYPASS ROUTE, 34 PRESSURE REGULATING VALVE, 36 FUEL CELL BYPASS ROUTE, 38 FUEL CELL BYPASS VALVE, 40 PRESSURE CONTROLLING FLOW PATH, 42 HOUSING, 44 PARTITIONING PORTION, 46 MAIN DIAPHRAGM, 48 SUB DIAPHRAGM, 50 VALVE CLOSING PRESSURE CHAMBER, 52 VALVE OPENING PRESSURE CHAMBER, 54 ATMOSPHERIC PRESSURE CHAMBER, 56 FLOW PATH CONFIGURING PRESSURE CHAMBER, 58 VALVE MEMBER, 60 DRIVE SHAFT, 62 VALVE MEMBER BODY, 63 DRIVE SHAFT SIDE CYLINDRICAL SURFACE PORTION, 64 CYLINDRICAL MEMBER, 66 DIAPHRAGM SIDE CYLINDRICAL PORTION, 67 ANNULAR DEFORMED PORTION, 68 HOUSING SIDE CYLINDRICAL SURFACE PORTION, 70 SECOND DIAPHRAGM SIDE CYLINDRICAL PORTION, 72 ATMOSPHERE COMMUNICATION PIPE, 74 PRESSER MEMBER, 76 SUPPLY AND EXHAUST PIPE, 78 COIL SPRING, 80 VALVE SEAT, 82 INLET, 84 OUTLET.

DESCRIPTION OF EXEMPLARY EMBODIMENTS

First Embodiment of the Invention

Figure 1:
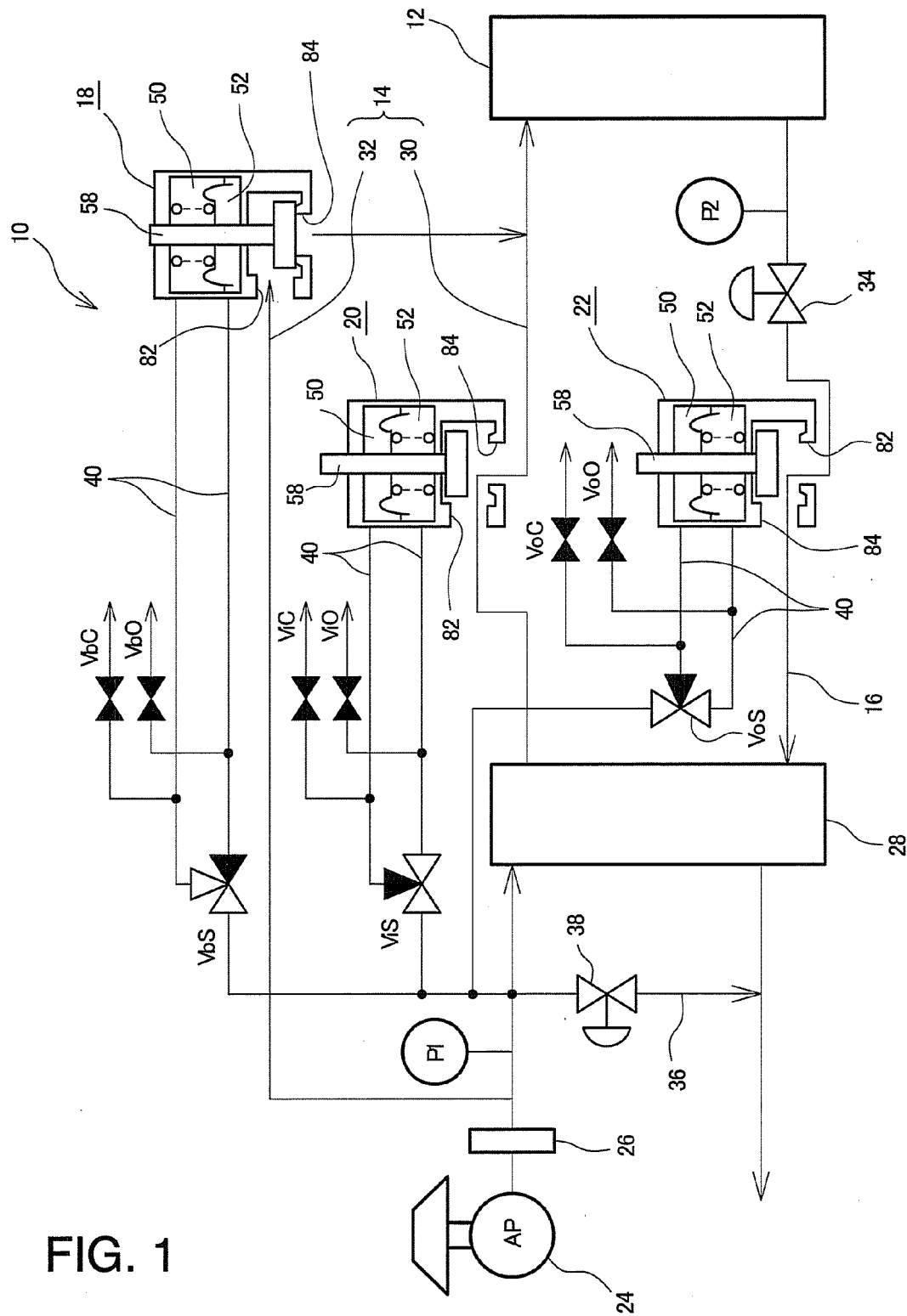
FIG. 1 is a diagram showing a basic configuration of a fuel cell system according to a first embodiment of the present invention.

Hereinafter, embodiments of the present invention will be described with reference to the drawings. FIGS. 1 to 6 show a first embodiment of the present invention. FIG. 1 is a schematic block diagram of a fuel cell system according to the first embodiment. The fuel cell system 10 includes a fuel cell stack 12, an oxidized gas supply flow path 14, an oxidized gas related exhaust flow path 16, a humidifier bypass valve 18, an inlet shutoff valve 20 and an outlet shutoff valve 22.

The fuel cell stack 12 generates electric power through an electrochemical reaction of oxygen and hydrogen. That is, by supplying hydrogen gas as fuel gas, and air as oxidized gas to the fuel cell stack 12, the oxygen and hydrogen electrochemically react and electric energy is obtained in a plurality of fuel cells, not illustrated, in the fuel cell stack 12. Each fuel cell includes a membrane-electrode assembly formed by, for example, an electrolyte membrane, an anode electrode, a cathode electrode, and separators at both sides of it.

The fuel cell system 10 of the present embodiment may be installed on a vehicle as the system for a fuel cell vehicle, for example, in which the fuel cell stack 12 acts as a power supply for a vehicle traveling motor. Naturally, the fuel cell system of the present embodiment can be used for purposes other than travel of a vehicle.

In order to supply air, which is the oxidized gas, to the fuel cell stack 12, the oxidized gas supply flow path 14 is provided. An air compressor 24 and an intercooler 26 are provided upstream in the oxidized gas supply flow path 14. The air compressed by the air compressor 24 is cooled in the intercooler 26, is humidified in a humidifier 28, and thereafter is supplied to a flow path at the cathode electrode side of the fuel cell stack 12.

Further, in addition to a main route 30 which is a first gas flow path for supplying the air to the fuel cell stack 12 after the air is passed through the humidifier 28, a humidifier bypass route 32, which is a second gas flow path and a detour of the main route 30, is provided in parallel with the main route 30 and the flow of the gas. The air which passes through the humidifier bypass route 32 is supplied to the fuel cell stack 12 without passing through the humidifier 28. A humidifier bypass valve 18 is provided midway in the humidifier bypass route 32.

Further, in order to exhaust air off-gas which is the air after being supplied to the fuel cell stack 12 and provided for the electrochemical reaction in each of the fuel cells from the fuel cell stack 12, the oxidized gas related exhaust flow path 16 is provided. The air off-gas which is exhausted through the oxidized gas related exhaust flow path 16 is fed to the humidifier 28 through a pressure regulating valve 34, and thereafter is released to the atmosphere through a dilution unit not illustrated. The pressure regulating valve 34 is controlled so that pressure (back pressure) of the air exhausted from the fuel cell stack 12 is appropriate corresponding to the operation state of the fuel cell stack 12. That is, the pressure of the air corresponding to the position of a pressure sensor P2 in the oxidized gas related exhaust flow path 16 is regulated by a valve opening of the pressure regulating valve 34. Further, the humidifier 28 plays the role of providing moisture obtained from the air which has been exhausted from the fuel cell stack 12 to the air is to be supplied to the fuel cell stack 12, in order to humidify that air.

A hydrogen gas supply flow path for supplying hydrogen gas, and a hydrogen gas related exhaust flow path for exhausting hydrogen gas related gas are connected to the fuel cell stack 12, but these flow paths are not illustrated in FIG. 1.

Further, in the main route 30 of the oxidized gas supply flow path 14, a fuel cell bypass route 36 is connected to between a spot between a connecting portion upstream of the humidifier bypass route 32 and the humidifier 28, and downstream of gas from the humidifier 28, in the oxidized gas related exhaust flow path 16 so as to be parallel with the fuel cell stack 12 with respect to the flow of the gas. A fuel cell bypass valve 38 is provided midway in the fuel cell bypass route 36. The fuel cell bypass valve 38 is used for controlling the pressure of the air which is supplied to the fuel cell stack 12. That is, in accordance with the valve opening of the fuel cell bypass valve 38, the pressure of the air corresponding to the position of an inlet pressure sensor P1 of the oxidized gas supply flow path 14 is regulated. The air pressure corresponding to the position of the inlet pressure sensor P1 can be also regulated by the flow rate of the air discharged from the air compressor 24. Naturally, the air pressure corresponding to the position of the input pressure sensor P1 can also be regulated by using both the valve opening of the fuel cell bypass valve 38 and the discharge flow rate.

Further, the fuel cell system 10 preferably increases the temperature of the fuel cell stack 12 quickly during start-up at a low temperature, such as a below-zero temperature. For this purpose, it may be considered that the amount of air which is supplied to the fuel cell stack 12 is made smaller than the amount corresponding to electric power generated by the reaction with hydrogen gas as compared with the amount of hydrogen gas supplied to the fuel cell stack 12, that is to say, the cathode stoichiometric ratio is reduced, and electric power is generated with low efficiency in order to thereby quickly increase the temperature of the fuel cell stack 12. However, when this is done, there is a possibility that hydrogen will enter the flow path at the cathode side through the electrolyte membrane from the flow path at the anode side of the fuel cell stack 12 and that the hydrogen concentration in the oxidized gas related exhaust flow path 16 will become high. When this occurs, the above-described fuel cell bypass valve 38 is opened, a procedure which also can be employed for reducing the hydrogen concentration in the oxidized gas related exhaust flow path 16 by the air which does not pass through the fuel cell stack 12.

Furthermore, the inlet shutoff valve 20 and the outlet shutoff valve 22 are provided downstream from the humidifier 28 of the main route 30 of the oxidized gas supply flow path 14, and upstream from the humidifier 28 of the oxidized gas related exhaust flow path 16, respectively.

Specifically, three PSVs (Pressure Switching Valves) which are normal close type electromagnetic valves are connected to each of the inlet shutoff valve 20 and the outlet shutoff valve 22, which are fuel cell valves and fluid control valves regulating the flow of the air in the flow path, and the above-described humidifier bypass valve 18 through a pressure controlling flow path 40.

Specifically, three PSVs VbS, VbC and VbO are connected to the humidifier bypass valve 18. Further, three PSVs ViS, ViC and ViO are connected to the inlet shutoff valve 20, and three PSVs VoS, VoC and VoO are connected to the outlet shutoff valve 22. These PSVs are connected upstream of the main route 30 of the oxidized gas supply flow path 14, for example, between the air compressor 24 and the humidifier 28, through the pressure controlling flow path 40. All of these PSVs, VbS, VbC, VbO, ViS, ViC, ViO, VoS, VoC and VoO, are controlled by a control unit such as an ECU (Electronic Control Unit), not illustrated. The humidifier bypass valve 18, the inlet shutoff valve 20 and the outlet shutoff valve 22 are all driven by a pressure difference of the gas that is a fluid existing in internal pressure chambers. Further, the pressure controlling flow path 40 supplies the gas which is a fluid for generating a pressure difference to each of the above-described valves 18, 20 and 22.

Next, the configurations and operations of the inlet shutoff valve 20 and the outlet shutoff valve 22 will be described referring to FIGS. 2 and 3, with the inlet shutoff valve 20 given as a typical example. The configurations of the inlet shutoff valve 20 and the outlet shutoff valve 22 themselves are the same, while the configuration of the humidifier bypass valve 18 will be described further below.

Figure 2:
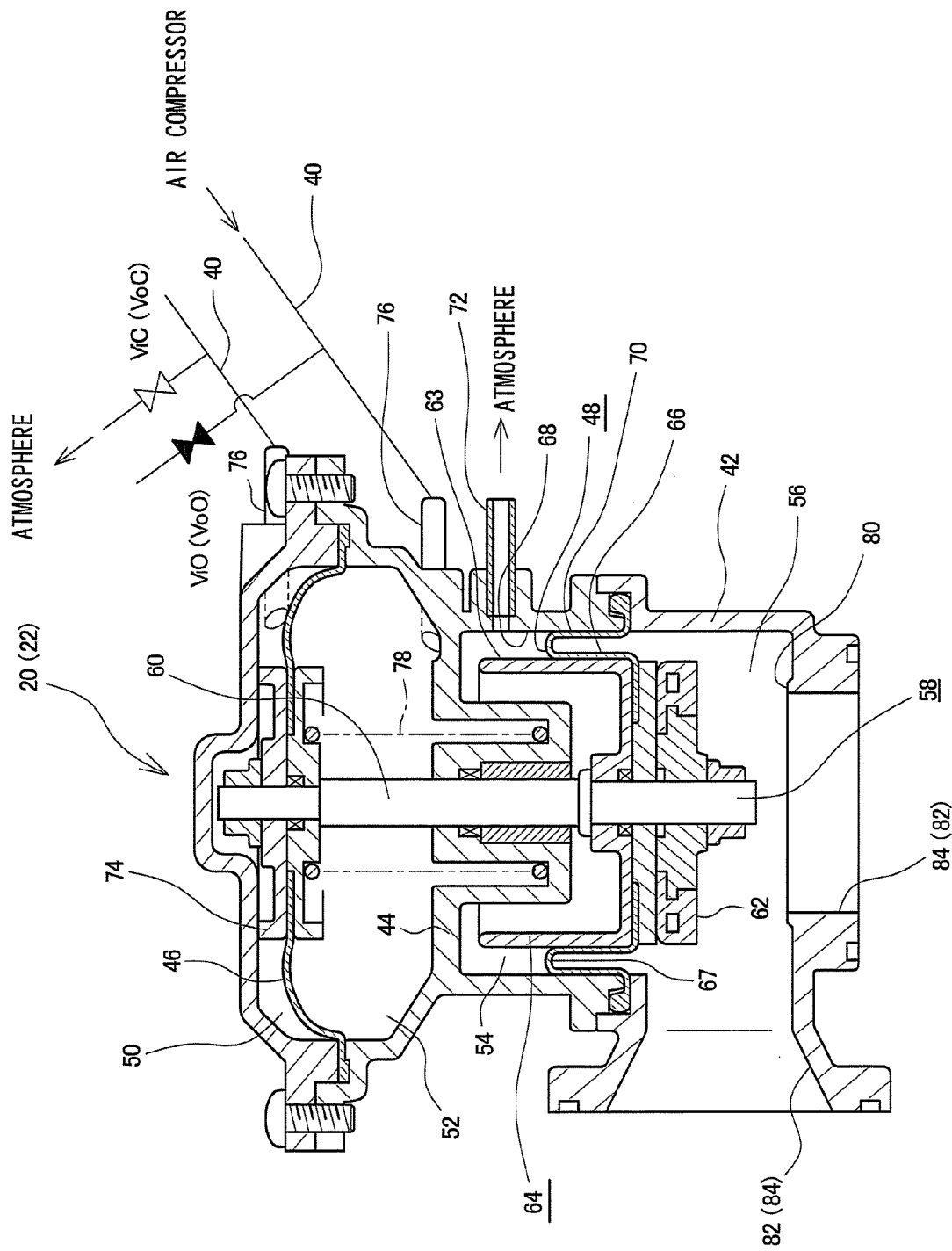
FIG. 2 is a sectional view showing a structure of an inlet or outlet shutoff valve used in the fuel cell system of FIG. 1 in a valve opened state.

As shown in FIG. 2, a normal open type shutoff valve is adopted as the inlet shutoff valve 20. The valve member of such a valve opens in a normal state in which the pressure within all the internal pressure chambers is the same.

The inlet shutoff valve 20 is provided with two upper and lower spaces partitioned by a partitioning portion 44 inside a housing 42 formed by connecting a plurality of housing elements, and by providing a main diaphragm 46 and an sub diaphragm 48 respectively in the two spaces; a valve closing pressure chamber 50 is provided on a top surface side of the main diaphragm 46: a valve opening pressure chamber 52 is provided on an undersurface side of the main diaphragm 46; an atmospheric pressure chamber 54 is provided on a top surface side of the sub diaphragm 48; and a flow path configuring pressure chamber 56 is provided on an undersurface side of the sub diaphragm 48. The valve closing pressure chamber 50, the valve opening pressure chamber 52, the atmospheric pressure chamber 54, and the flow path configuring pressure chamber 56 are separated from one another, and none of these pressure chambers 50, 52, 54 and 56 communicate with any other chamber internally.

Further, the main diaphragm 46 and the sub diaphragm 48 are connected to a valve member 58. Specifically, the valve member 58 having a drive shaft 60 is included inside the housing 42, and the valve member 58 is supported in the housing 42 to be displaceable in an axial direction of the drive shaft 60. The valve member 58 has the drive shaft 60 and a valve member body 62 in a disk shape connected to a lower end portion of the drive shaft 60. Further, a cylindrical member 64 in a cylinder shape having a bottom plate and a drive shaft side cylindrical surface portion 63 on an outer peripheral surface is connected to a portion near a lower end of an intermediate portion of the drive shaft 60.

Further, an inner peripheral side end portion of the sub diaphragm 48 formed from an elastic material such as rubber is sandwiched between a lower surface of a bottom plate portion of the cylindrical member 64 and a top surface of the valve member body 62, and an inner peripheral portion of the sub diaphragm 48 is connected to the drive shaft 60. An outer peripheral side end portion of the sub diaphragm 48 is connected to an inner peripheral portion of the housing 42 so as to be sandwiched by two housing elements configuring the housing 42. Thereby, an upper side and a lower side of the space at the lower side of the partitioning portion 44 in the housing 42 are separated by the atmospheric pressure chamber 54 and the flow path configuring pressure chamber 56 by the sub diaphragm 48.

Further, a diaphragm side cylindrical portion 66 which is elastically deformed to be pressed along a drive shaft side cylindrical surface portion 63 is provided near an inner diameter of an intermediate portion in the diameter direction of the sub diaphragm 48. In the valve opened state as shown in FIG. 3, a lower side of an annular deformed portion 67 located between the drive shaft side cylindrical surface portion 63 of the cylindrical member 64 and the inner surface of the housing 42 of the sub diaphragm 48 is deformed upward in a "mountain shape", and subjected to the pressure of the flow path configuring pressure chamber 56. The lower side of the annular deformed portion 67 is subjected to the pressure of the flow path configuring pressure chamber 56, and thereby, the drive shaft 60 is displaced upward while elastically deforming the upper portion of the diaphragm side cylindrical portion 66 so as to peel the upper portion of the diaphragm side cylindrical portion 66 from the drive shaft side cylindrical surface portion 63 as shown in FIG. 2.

Further, a second diaphragm side cylindrical portion 70 which is elastically deformed to as to be pressed along a housing side cylindrical surface portion 68 provided on the inner surface of the housing 42 is provided near to an outer diameter of an intermediate portion in a diameter direction of the sub diaphragm 48. When the drive shaft 60 is displaced downward as shown in FIG. 3 from the valve opened state as shown in FIG. 2, the upper portion of the second diaphragm side cylindrical portion 70 is elastically deformed to be peeled off from the housing side cylindrical surface portion 68.

The flow path configuring pressure chamber 56 is part of the oxidized gas supply flow path 14 (see FIG. 1) (the oxidized gas related exhaust flow path 16 in the case of the outlet shutoff valve 22), and a gas upstream side and a gas downstream side are shut off or connected by the valve member 58. Further, an atmosphere communication pipe 72 with one end communicating with the atmosphere is connected to the atmospheric pressure chamber 54, and the atmospheric pressure chamber 54 is open to the air.

Further, a presser member 74 which is formed by connecting two substantially disk-shaped elements is connected to an upper end portion of the valve member 58, and an inner peripheral side end portion of the main diaphragm 46 made of an elastic material such as rubber is sandwiched between the two substantially disk-shaped elements. An outer peripheral side end portion of the main diaphragm 46 is connected to an inner peripheral portion of the housing 42 so as to be sandwiched by two housing elements configuring the housing 42. With this configuration, an upper side and a lower side of a space on the upper side of the partitioning portion 44 in the housing 42 are separated into the valve closing pressure chamber 50 and the valve opening pressure chamber 52. Further, a supply and exhaust pipe 76 is connected to the valve closing pressure chamber 50 and the valve opening pressure chamber 52.

Further, a coil spring 78 is provided as elastic force applying means between a lower side surface of the presser member 74 and an upper side surface of the partitioning portion 44 to apply an elastic force to the valve member 58 in the upward direction, that is, in the direction which would open the valve. The valve member 58 displaces in the downward direction, whereby the lower side of the valve member body 62 is seated on a valve seat 80 to shut off the flow path. In other words, by displacement in the axial direction of the drive shaft 60, the inside of the flow path is shut off or connected. Further, the diameter of a pressure receiving area of the upper portion of the drive shaft 60 including the main diaphragm 46 is made sufficiently larger than the diameter of a pressure receiving area of the lower portion of the drive shaft 60 including the sub diaphragm 48.

Figure 3:
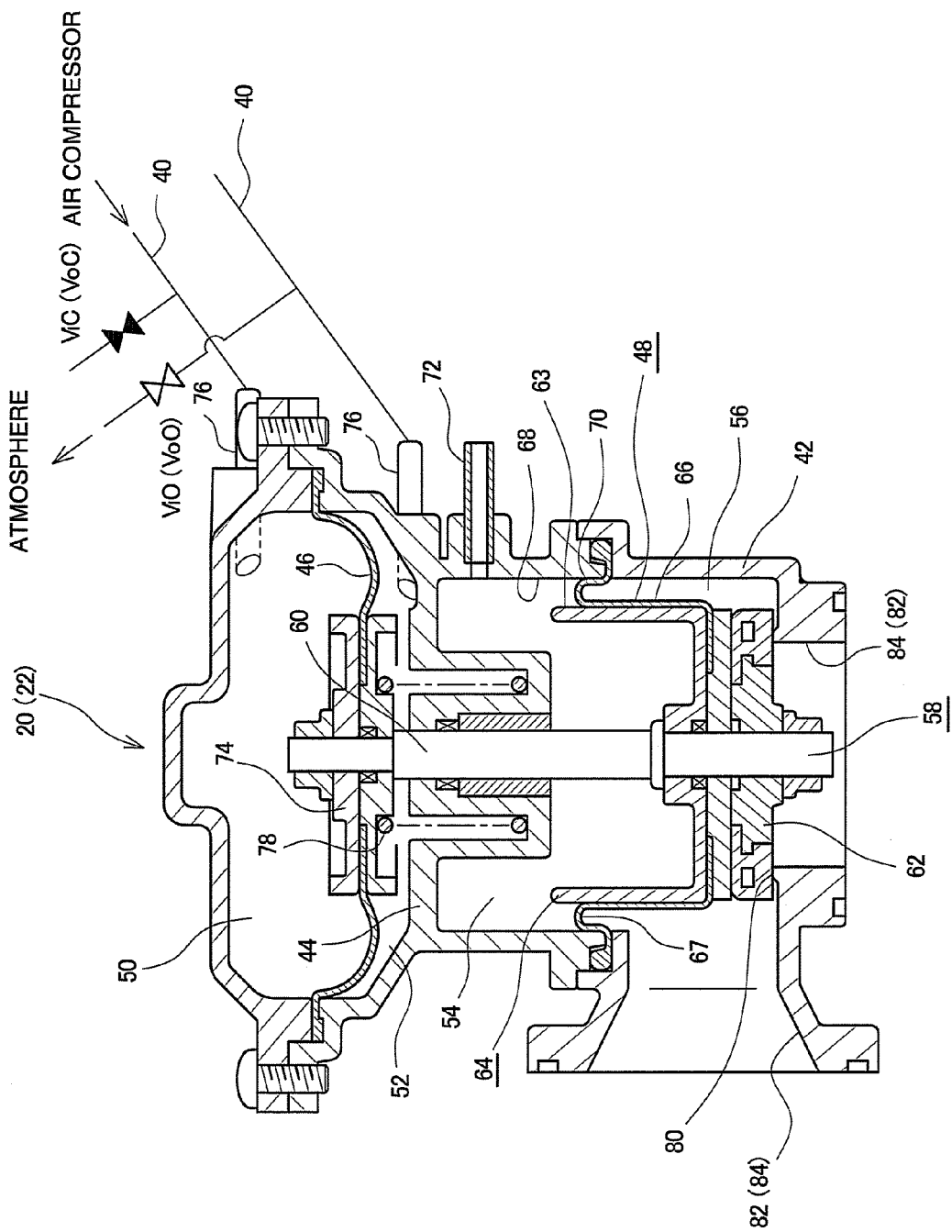
FIG. 3 is a sectional view showing the structure of the inlet or outlet shutoff valve in a valve closed state.

In such an inlet shutoff valve 20, the valve closing pressure chamber 50 is connected to the pressure controlling flow path 40 at the side of the PSV ViC via the supply and exhaust pipe 76 (FIGS. 2 and 3). Further, the valve opening pressure chamber 52 is connected to the pressure controlling flow path 40 at the side of the PSV ViO via the supply and exhaust pipe 76.

By the displacement in the axial direction of the drive shaft 60, a central portion of the main diaphragm 46 is displaced vertically.

When the valve member 58 is driven upward by displacement of the drive shaft 60 as shown in FIG. 2, the air flowing toward an inlet 82 of the inlet shutoff valve 20 from the upstream side of the oxidized gas supply flow path 14 (FIG. 1) is exhausted to the fuel cell stack 12 (FIG. 1) side from an outlet 84 of the inlet shutoff valve 20. Meanwhile, when the valve member 58 is driven downward by displacement of the drive shaft 60 as shown in FIG. 3, the outlet 84 is closed, and the flow of the air toward to the fuel cell stack 12 from upstream of the oxidized gas supply flow path 14 is shut off.

In the outlet shutoff valve 22, the inlet 82 and the outlet 84 are opposite with respect of the inlet shutoff valve 20 as shown in FIG. 1. When the valve member 58 is driven upward by displacement of the drive shaft 60 (FIGS. 2 and 3), air off-gas which flows toward the inlet 82 of the outlet shutoff valve 22 from upstream of the oxidized gas related exhaust flow path 16 is exhausted to the humidifier 28 side from the outlet 84 of the outlet shutoff valve 22. Meanwhile, when the valve member 58 is driven downward by displacement of the drive shaft 60, the inlet 82 is closed, and the flow of the air off-gas toward the humidifier 28 from the upstream side of the oxidized gas related exhaust flow path 16 is shut off.

Displacement in the axial direction of the drive shaft 60 is controlled by three PSVs. That is, in the inlet shutoff valve 20, the pressures of the valve opening pressure chamber 52 and the valve closing pressure chamber 50 are controlled by the three PSVS ViS, ViC, and ViO. Further, in the outlet shutoff valve 22, the pressures of the valve opening pressure chamber 52 and the valve closing pressure chamber 50 are controlled by the three PSVs of VoS, VoC and VoO.

The ViS (or VoS) shown in FIG. 1 is a 3 WAY, that is, a three-way valve type PSV, and selectively connects one of the valve closing pressure chamber 50 and the valve opening pressure chamber 52 to the gas upstream side of the air compressor 24, and shuts off the pressure chamber of the other one and the gas upstream side of the air compressor 24. Further, the ViC, ViO, VoC and VoO are all two-way type PSVs, and function as exhausting valves, that is, pressure releasing valves.

Further, the ViS (or VoS) changes the connecting state of the flow path by an energized state. In a not energized state (non-energized state), the ViS (or VoS) connects a gas discharge side of the air compressor 24 and the valve opening pressure chamber 52. In an energized state, the ViS (or VoS) connects the gas discharge side of the air compressor and the valve closing pressure chamber 50. Further, the ViC, ViO, VoC and VoO are all normally closed type electromagnetic valves which close the valves in the non-energized state and open the valves in the energized state, namely, shut off the flow path when the system is not operating.

In FIGS. 1 to 3, among the plurality of triangles expressing the ViS (VoS), ViC (VoC), and ViO (VoO), the black triangles show the state shutting off the flow paths, while the white triangles show the state connecting the flow paths (this also applies to FIGS. 4 and 5 as described below).

The inlet shutoff valve 20 and outlet shutoff valve 22 are closed when power generation of the fuel cell stack 12 stops. Next, with reference to FIG. 4, an example of shifting of the inlet shutoff valve 20 (or the outlet shutoff valve 22) from the valve opened state (state shown in FIG. 2) to the valve closed state (state shown in FIG. 3) when the power generation of the fuel cell stack is stopped will be described. As shown in FIG. 4(a), in the state in which the inlet shutoff valve 20 is opened, all of ViS, ViC and ViO are in a non-energized state. In this state, pressurized air from the air compressor 24 (FIG. 1) is introduced into the valve opening pressure chamber 52 via the pressure controlling flow path 40. In FIG. 4 (and FIG. 5), the shaded portions indicate that higher pressure air is introduced.

Subsequently, the ViS is brought from this state into an energized state as shown in FIG. 4(b), so that pressurized air from the air compressor 24 (FIG. 1) is introduced into the valve closing pressure chamber 50 via the pressure controlling flow path 40. Further, the ViO is brought into the energized state, that is, into the valve opened state, and the valve opening pressure chamber 52 is opened to atmosphere. As a result, a first force F1 to the downward direction acts on the drive shaft 60 due to a pressure difference which occurs between the pressure of the valve closing pressure chamber 50 and the pressure (atmospheric pressure) of the valve opening pressure chamber 52. Meanwhile, because air pressurized by the air compressor 24 is also introduced into the flow path configuring pressure chamber 56, a second force F2 to the upward direction which is in the opposite direction from the first force F1 acts on the drive shaft 60 by the pressure difference which occurs between the pressure of the flow path configuring pressure chamber 56 and the pressure of the atmospheric pressure chamber 54 which communicates with atmosphere. However, in the case of the present embodiment, as shown in FIGS. 2 and 3, the diameter of the pressure receiving area of the upper portion of the drive shaft 60 including the main diaphragm 46 is made sufficiently larger than the diameter of the pressure receiving area of the lower portion of the drive shaft 60 including the sub diaphragm 48. Therefore, as shown in FIGS. 4(b) and 3, the drive shaft 60 displaces downward against the second force F2 and the elastic force of the coil spring 78 (FIG. 3), and the valve member body 62 is seated on the valve seat 80.

Subsequently, in this state, the ViS is brought into a non-energized state as shown in FIG. 4(c), that is, the discharge side of the air compressor 24 communicates with the valve opening pressure chamber 52. However, the pressure inside the valve opening pressure chamber 52 does not increase because the ViO is opened. As a result, the pressure inside the valve closing pressure chamber 50 and the pressure inside the pressure controlling flow path 40 communicating with the valve closing pressure chamber 50 are kept at a high pressure.

Next, after drive of the air compressor 24 is stopped, the ViO is brought into a non-energized state, that is, into a valve closed state as shown in FIG. 4(d). In this case, because the pressure inside the valve opening pressure chamber 52 decreases, the state in which the pressure inside the valve closing pressure chamber 50 is larger than the pressure inside the valve opening pressure chamber 52 is maintained. Therefore, all the PSVs ViS, ViC and ViO are in the non-energized state, and though the inlet shutoff valve 20 is a normally open type, the inlet shutoff valve 20 can be kept in the closed valve state. Similarly, the normally open type outlet shutoff valve 22 (FIG. 1) is also changed to the valve closed state from the valve opened state at the time of stop of power generation of the fuel cell stack 12 by controlling VoS, VoC and VoO, and the valve closed state is maintained in the non-energized states of all the PSVs VoS, VoC and VoO.

Meanwhile, the humidifier bypass valve 18 shown in FIG. 1 is a normally closed type shut off valve which is in the valve closed state in which the valve member 58 is closed in the normal state in which all the pressure chambers provided inside are at the same pressure. The humidifier bypass valve 18, which is not illustrated, has a structure in which the coil spring 78 (see FIGS. 2 and 3) is provided between the upper surface of the bottom plate portion of the cylindrical member 64 and the lower surface of the partitioning portion 44, which is the same structure as that of the inlet shutoff valve 20 or the outlet shutoff valve 22 shown in FIGS. 2 and 3. The humidifier bypass valve 18 can be made a normally closed type shut off valve by providing a coil spring between the upper surface of the member fixed to the upper end portion of the valve member 58 such as the presser member 74 (see FIGS. 2 and 3) and the lower surface of the housing 42 (see the schematic view of FIG. 1).

Such a humidifier bypass valve 18 connects the valve closing pressure chamber 50 to the pressure controlling flow path 40 at the VbC side of the PSV, and connects the valve opening pressure chamber 52 to the pressure controlling flow path 40 at the VbO side of the PSV, respectively, as shown in FIG. 1.

When the valve member 58 is driven upward by displacement of the drive shaft 60, the air flowing toward the inlet 82 of the humidifier bypass valve 18 from upstream of the humidifier bypass route 32 is exhausted to the fuel cell stack 12 side from the outlet 84 of the humidifier bypass valve 18. Meanwhile, when the valve member 58 is driven downward by displacement of the drive shaft 60, the outlet 84 is closed, and the flow of the air toward the fuel cell stack 12 from upstream of the humidifier bypass route 32 is shut off.

Displacement in the axial direction of the drive shaft 60 is controlled by VbS, VbC and VbO which are three PSVs as in the case of the inlet shutoff valve 20 and the outlet shutoff valve 22. In FIG. 1, among the plurality of triangles expressing VbS, VbC and VbO, the black triangles show the state of shutting off the flow paths, while the white triangles show the state of connecting the flow paths.

Further, VbS changes the connecting state of the flow path in accordance with the energized state. VbS connects the gas discharge side of the air compressor 24 and the valve closing pressure chamber 50 when it is not energized (in a non-energized state), and connects the gas discharge side of the air compressor 24 and the valve opening pressure chamber 52 in an energized state. Further, the VbC and VbO are normally closed type electromagnetic valves which are closed in a non-energized state, and open in an energized state. As such, they serve to shut off the flow paths when the system is not operating.

Such a humidifier bypass valve 18 is in closed state at the time of stopping power generation of the fuel cell stack 12. When the humidifier bypass valve 18 is closed in this manner, VbS, VbC and VbO are all brought into the non-energized state with the valve member 58 being pressed to the valve seat by the elastic force of the coil spring as shown in FIG. 1.

The humidifier bypass valve 18 can be brought into the valve closed state by introducing air pressurized by the air compressor 24 into the valve closing pressure chamber 50, and opening the valve opening pressure chamber 52 to atmosphere. At this time, the drive shaft 60 is driven downward by the force acting downward on the drive shaft 60 by the pressure difference of the valve opening pressure chamber 52 and the valve closing pressure chamber 50, and the elastic force of the coil spring. In this case, an upward force acts on the drive shaft 60 due to the pressure difference of the flow path configuring pressure chamber 56 and the atmospheric pressure chamber 54, but the drive shaft 60 is displaced downward because the diameter of the pressure receiving area of the upper portion of the drive shaft 60 including the main diaphragm 46 (see FIGS. 2 and 3) is made sufficiently larger than the diameter of the pressure receiving area of the lower portion of the drive shaft 60 including the sub diaphragm 48 (see FIGS. 2 and 3), and the elastic force of the coil spring in combination. The humidifier bypass valve 18 is closed.

As described above, the PSVs VbS, VbC, VbO, ViS, ViC, ViO, VoS, VoC and VoO for controlling the pressures of the humidifier bypass valve 18, the inlet shutoff valve 20, and the outlet shutoff valve 22 are controlled by the control unit (not illustrated) such as the ECU. More specifically, when power generation by the fuel cell stack 12 is halted, the control unit tightly shuts off the upstream and downstream side gas flow at the cathode electrode side of the fuel cell stack 12 by shutting off, namely, closing all of the inlet shutoff valve 20, the humidifier bypass valve 18, and the outlet shutoff valve 22.

Further, the control unit includes pressure applying unit which cause pressure corresponding to the first pressure value, that is, the first discharge pressure of the air compressor 24 on the valve opening pressure chamber 52 which communicates with the air compressor 24 in any valve out of the inlet shutoff valve 20, the humidifier bypass valve 18 and the outlet shutoff valve 22, open the valve closing pressure chamber 50 to atmosphere through the PSV corresponding to any valve out of the PSVs VbC, ViC and VoC, and thereby cause the above-described valves to open.

Next, operation in the case of opening the inlet shutoff valve 20 and the outlet shutoff valve 22 at the time of start of power generating operation of the fuel cell stack 12 will be described with reference to FIG. 5 with the inlet shutoff valve 20 as a typical example. FIG. 5(a) corresponds to the above-described FIG. 4(d). When the inlet shutoff valve 20 is opened, the air compressor 24 (see FIG. 1) is started with the ViS kept in the non-energized state in FIG. 5(a). Thereafter, the ViC is brought into an energized state as shown in FIG. 5(b), namely, is brought into a valve opened state, and the valve closing pressure chamber 50 is opened to atmosphere. Thereby, the pressurized air in the valve closing pressure chamber 50 is released to the atmosphere, and the pressure is reduced. Further, pressurized air from the air compressor 24 is introduced into the valve opening pressure chamber 52 through the pressure controlling flow path 40. Thereby, a pressure difference occurs between the pressure of the valve opening pressure chamber 52 and the pressure (atmospheric pressure) of the valve closing pressure chamber 50.

Further, the pressurized air is also introduced into the flow path configuring pressure chamber 56 from the air compressor 24, and, therefore, a pressure difference also occurs between the pressure of the flow path configuring pressure chamber 56 and the pressure of the atmospheric pressure chamber 54 which communicates with the atmosphere. The pressure of the flow path configuring pressure chamber 56 is applied to the lower surface of the annular deformed portion 67 of the sub diaphragm 48 shown in FIG. 3, which then in turn pushes up the cylindrical member 64, such that the drive shaft 60 is displaced upward as shown in FIGS. 2 and 5(b). As a result, the drive shaft 60 is driven upward by both forces F3 and F4 that are the third force F3 which acts on the drive shaft 60 upward by the pressure difference between the flow path configuring pressure chamber 56 and the atmospheric pressure chamber 54, and the fourth force F4 which acts on the drive shaft 60 upward by the pressure difference between the valve closing pressure chamber 50 and the valve opening pressure chamber 52, and the elastic force of the coil spring 78 (see FIGS. 2 and 3).

Further, in the state in which the inlet shutoff valve 20 is fully opened, ViC is brought into a non-energized state, that is, a closed state, and thereby, the valve closing pressure chamber 50 and the atmosphere are shut off from each other. In the non-energized state of all the PSVs ViS, ViC and ViO, the open state of the inlet shutoff valve 20 is maintained. Similarly, in the case of the outlet shutoff valve 22 (FIG. 1), the outlet shutoff valve 22 is changed from a closed state to an opened state at the time of start of power generating operation of the fuel cell stack 12 by controlling VoC, and the valve opened state is kept in the non-energized state of all the PSVs, VoS, VoC and VoO.

Meanwhile, when the humidifier bypass valve 18 shown in FIG. 1 is opened, air pressurized by the air compressor 24 is introduced into the valve opening pressure chamber 52, and the valve closing pressure chamber 50 is opened to the atmosphere. As a result, the drive shaft 60 is driven upward against the elastic force of the coil spring by forces F3' and F4', which are, respectively, the third force which acts on the drive shaft 60 (see FIGS. 2 and 3) upward by the pressure difference between the flow path configuring pressure chamber 56 into which air pressurized by the air compressor 24 is introduced and the atmospheric pressure chamber 54 (see FIGS. 2 and 3), and the fourth force which acts on the drive shaft 60 upward by the pressure difference between the valve closing pressure chamber 50 and the valve opening pressure chamber 52. Subsequently, the humidifier bypass valve 18 is opened.

Figure 4:
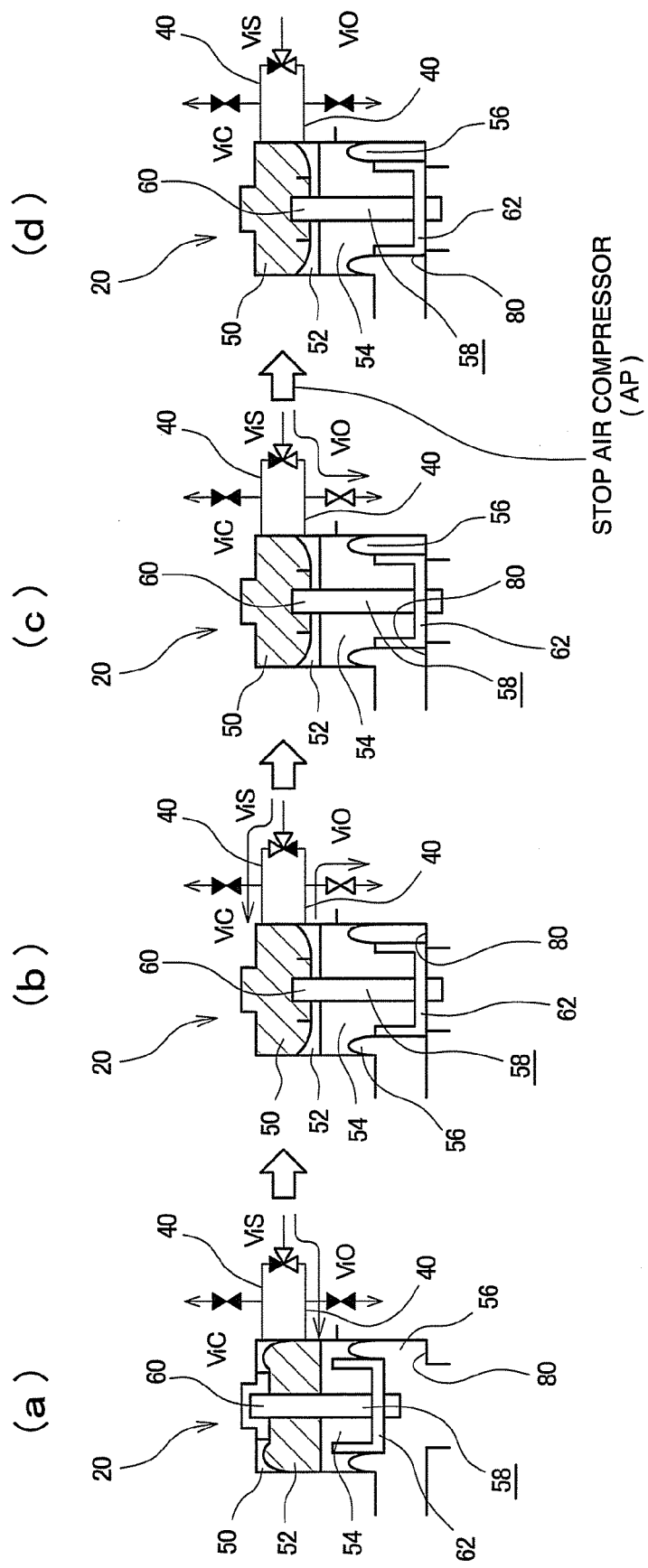
FIG. 4 is a schematic sectional view for explaining the sequential switching of PSV when the inlet shutoff valve is shifted to a valve closed state from a valve opened state.
Figure 5:
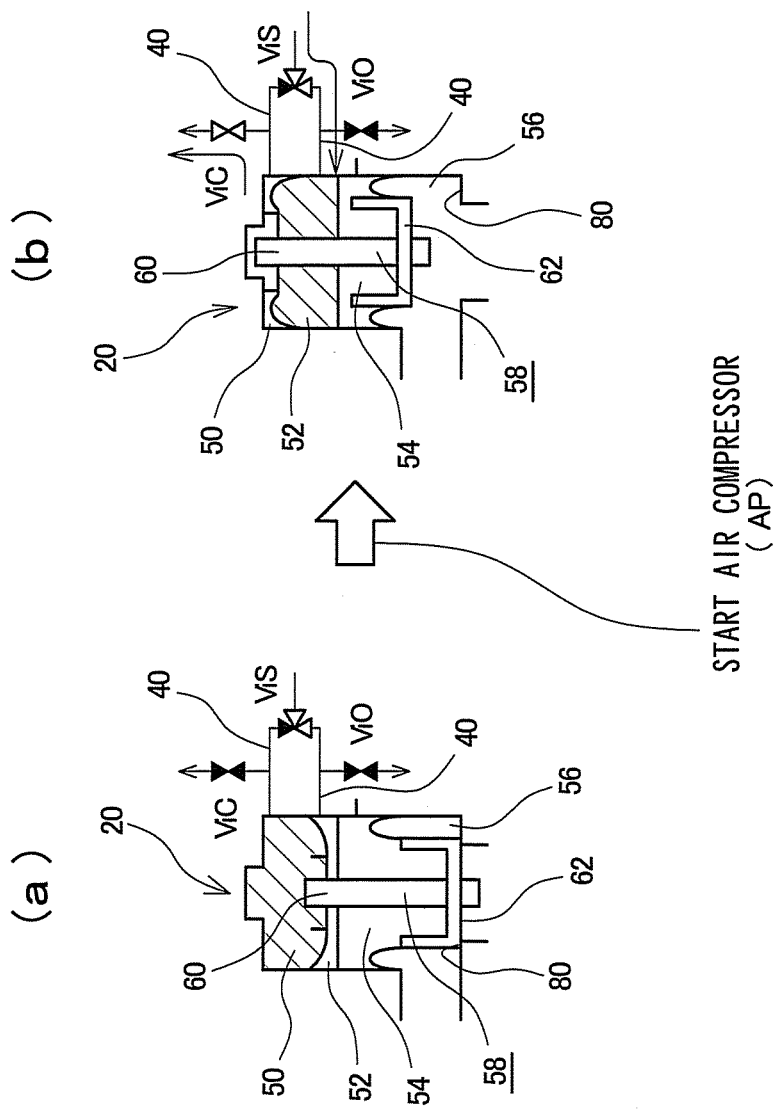
FIG. 5 is a schematic sectional view for explaining the sequential switching of the PSV when the inlet shutoff valve is shifted to a valve opened state from a valve closed state.

As described using the inlet shutoff valve 20 as a typical example, in the configuration of FIG. 4 as described above, all of the inlet shutoff valve 20, the humidifier bypass valve 18 and the outlet shutoff valve 22 are shut off, that is, brought into a closed state, at the time of stop of power generation of the fuel cell stack 12. In contrast with this, at the time of starting of power generating operation, as described above using the inlet shutoff valve 20 as an example a typical example of the system of FIG. 5, the outlet shutoff valve 22 is opened, and, at the same time, one of the inlet shutoff valve 20 and the humidifier bypass valve 18 is opened. For example, among the inlet shutoff valve 20 and the humidifier bypass valve 18, first only the humidifier bypass valve 18 is opened at the time of start of power generation, and air is supplied to the fuel cell stack 12 through only the humidifier bypass route 32. Subsequently, after elapse of a predetermined time, among the inlet shutoff valve 20 and the humidifier bypass valve 18 only the inlet shutoff valve 20 is opened, and air is supplied to the fuel cell stack 12 through only the main route 30 out of the humidifier bypass route 32 and the main route 30, and power is generated.

The reason why air is supplied to the fuel cell stack 12 through the humidifier bypass route 32 first when power generation is started is that, if the air passing through the humidifier 28 is supplied to the fuel cell stack 12 at the time of start-up, an excessive amount of water accumulates inside when the temperature of the fuel cell stack 12 is low, and power generation is likely to be inhibited. Therefore, by supplying dry air to the fuel cell stack 12 through the humidifier bypass route 32 first at the time of start of power generation as described above, accumulation of excessive amount of water in the fuel cell stack 12 is effectively prevented and effective power generation performance can be ensured.

However, when one of the inlet shutoff valve 20 and the humidifier bypass valve 18 is stuck in a closed state as a result of freezing or the like when the environment is at a below-zero temperature, namely, the valve member 58 is stuck to the fixed portion by freezing or the like, there is a possibility that the valve which would normally be opened will not open when the pressure which usually opens the valve acts on the valve opening pressure chamber 52 of that valve. To provide for such circumstances, in the present embodiment, the control unit such as the ECU comprises fuel cell bypass valve controlling unit, which are pressure changing unit which change the first pressure value in the valve opening pressure chamber 52 under abnormal conditions in which the one of the valves is not driven even when the pressure inside the valve opening pressure chamber 52 of the one of the inlet shutoff valve 20 and the humidifier bypass valve 18 is at the first pressure value corresponding to the first discharge pressure of the air compressor 24.

The fuel cell bypass valve controlling unit have the function of opening the fuel cell bypass valve 38 (FIG. 1) by a predetermined amount (for example, 50% or the like) at the time of start-up, and of increasing the pressure value of the air which is supplied to the valve opening pressure chamber 52 of the above-described one valve to be larger than the first pressure value by restricting the opening of the fuel cell bypass valve 38 (for example, 20% or 0%, that is, totally closed) under abnormal conditions in which the above-described one valve is not driven even when the pressure inside the valve opening pressure chamber 52 is at the first pressure value.

Figure 6:
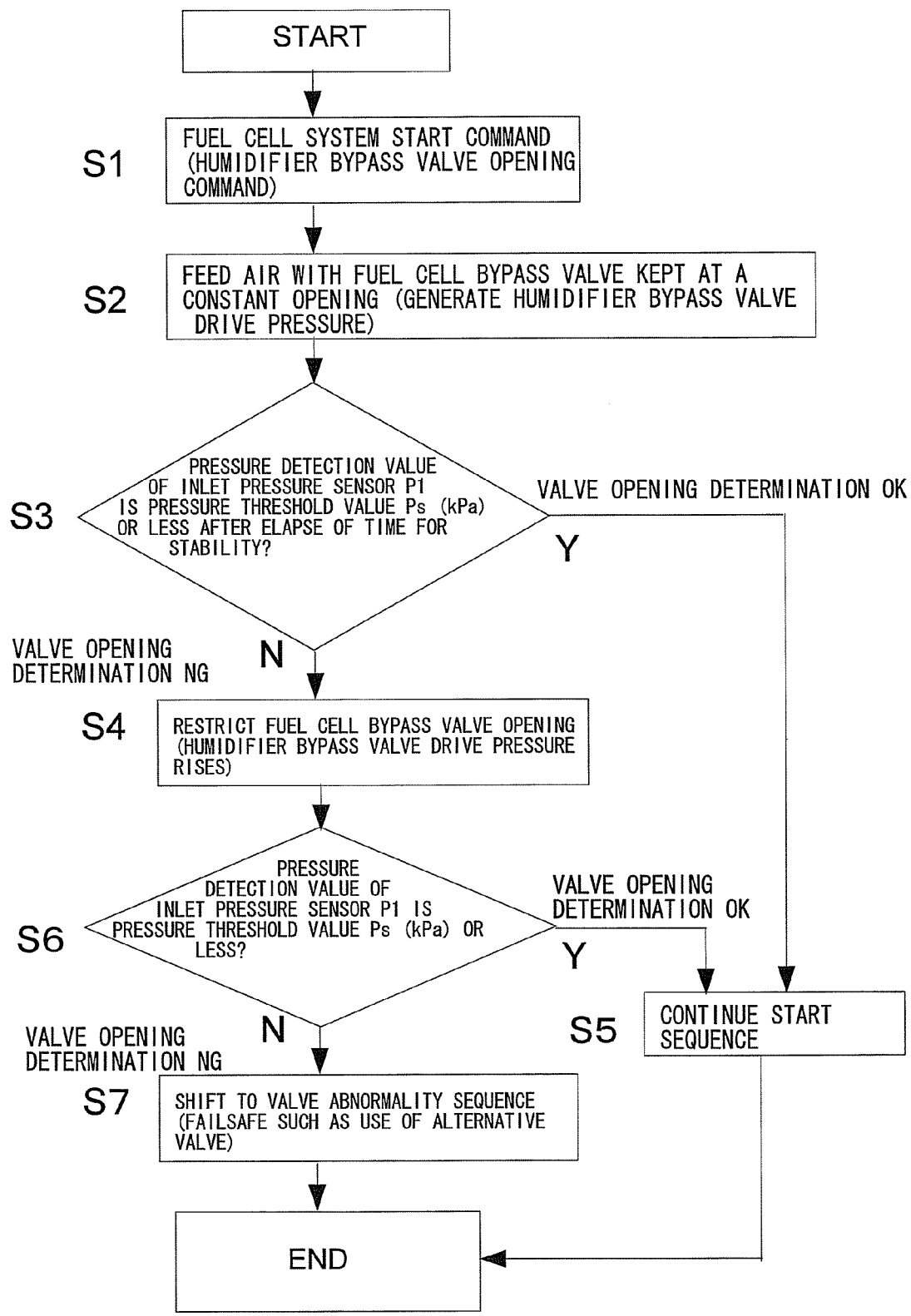
FIG. 6 is a flowchart showing a start control method in the fuel cell system according to the first embodiment of the present invention.

This will be described in more detail with use of the flowchart of FIG. 6. FIG. 6 shows a start control method when, out of the humidifier bypass valve 18 (FIG. 1) and the inlet shutoff valve 20 (FIG. 1), initially only the humidifier bypass valve 18 is opened at the time of start-up of power generation. When air is supplied to the fuel cell stack 12 when power generation is started according to the present embodiment, that is, when a start command is first sent to the fuel cell system 10 by turning on an ignition key or the like in step S1, the pressure applying unit of the control unit output a command signal for performing opening and closing control of VbS, VbC and VbO so as to open the humidifier bypass valve 18 on the basis of the valve opening command for the humidifier bypass valve 18. More specifically, the pressure applying unit outputs the command signal for bringing VbS and VbC into an energized state.

Next, in step S2 of FIG. 6, the pressure applying unit open the fuel cell bypass valve 38 to a fixed opening, such as half open (for example, the opening of 50%), operates the air compressor 24, and feeds pressurized air. Next, in step S3, the fuel cell bypass valve controlling unit of the control unit determines whether or not the pressure detection value of the inlet pressure sensor P1 reduces to a pressure threshold value Ps (kPa) or less after elapse of a fixed amount of time for stability while monitoring the pressure detection value of the inlet pressure sensor P1 located at the outlet of the air compressor 24 (FIG. 1). This time for stability is the amount time required for the discharge flow rate (feed rate) of the air by the air compressor 24 to reach, for example, 80%, and, after it reaches 80%, the control unit waits for a predetermined time of t1 sec to wait for stability. The discharge flow rate of the air by the air compressor 24 is monitored by an air flow meter, not illustrated.

Subsequently, in step S3, when it is determined that the pressure detection value of the inlet pressure sensor P1 does not become the pressure threshold valve Ps (kPa) or less after a lapse of the time for stability, that is, the humidifier bypass valve 18 is not normally opened (the valve opening determination is NG) by the fuel cell bypass valve controlling unit, the opening of the fuel cell bypass valve 38 is restricted (from, for example, the opening of 50%), and the pressure of the air which is supplied to the valve opening pressure chamber 52 of the humidifier bypass valve 18 is increased, next in step S4.

Next, after elapse of a predetermined time, in step S6 the fuel cell bypass valve controlling unit determine again whether or not the pressure detection value of the inlet pressure sensor P1 is reduced to the pressure threshold value Ps (kPa) or less. When it is determined that the pressure detection value of the inlet pressure sensor P1 does not become the pressure threshold value Ps (kPa) or less, that is, the humidifier bypass valve 18 is not in the state normally opened (valve opening determination is NG) by the determination in step S6, it is determined that the humidifier bypass valve 18 cannot be opened with opening control of the fuel cell bypass valve 38, and the flow next shifts, in step S7, to valve abnormality sequence control.

In the valve abnormality sequence control, opening and closing control of the PSVs ViS, ViC and ViO for driving the inlet shutoff valve 20 is performed so as to open the inlet shutoff valve 20 without opening the humidifier bypass valve 18. Thereby, the air discharged from the air compressor 24 is supplied to the fuel cell stack 12 through the main route 30, and power generation is started.

In contrast to this, when it is determined, after elapse of the time for stability, that the pressure detection value of the inlet pressure sensor P1 becomes the pressure threshold value Ps (kPa) or less, that is, the humidifier bypass valve 18 is in the state normally opened (the valve opening determination is OK) in step S3, the start sequence processing continues in step S5. Thereby, the air discharged from the air compressor 24 is supplied to the fuel cell stack 12 through the humidifier bypass route 32, and power generation is started.

Further, when it is determined that the pressure detection value of the inlet pressure sensor P1 becomes the pressure threshold value Ps (kPa) or less after elapse of the time for stability, that is, the humidifier bypass valve 18 is in the state normally opened (the valve opening determination is OK) in step S6, the start sequence processing also continues in step S5, so that the air discharged from the air compressor 24 is supplied to the fuel cell stack 12 through the humidifier bypass route 32 and power generation is started. After the sequence of any one of steps S5 and S7 is finished, that is, after the start processing is finished, the fuel cell bypass valve 38 is brought into a fully closed state.

In the above description, the case of generating power by supplying air to the fuel cell stack 12 through only the humidifier bypass route 32 first out of the humidifier bypass route 32 and the main route 30 at the time of start of power generation is described. However, the present embodiment is not limited to such a case, and can be carried out when first only the inlet shutoff valve 20 is opened at the time of start of power generation, and air is supplied to the fuel cell stack 12 through the main route 30. In such a case, the valve opening command for the inlet shutoff valve 20 is output in step S1, and when the flow shifts to the valve abnormality sequence control in step S7, the valve opening command for the humidifier bypass valve 18 is output. Subsequently, air is supplied to the fuel cell stack 12 through the humidifier bypass route 32, and power generation is started.

The fuel cell system 10 of the present embodiment as described above includes the humidifier bypass valve 18 and the inlet shutoff valve 20 which are driven in accordance with the pressure change in the air supplied from the air compressor 24, the pressure applying unit which drive one valve of the humidifier bypass valve 18 and the inlet shutoff valve 20 by causing the pressure at the first pressure value to act on the valve opening pressure chamber 52 which communicates with the air compressor 24 in the above describe one valve of the humidifier bypass valve 18 and the inlet shutoff valve 20, and the fuel cell bypass valve controlling unit which are the pressure changing unit which change the pressure at the first pressure value in the valve opening pressure chamber 52 of the one valve, namely, increase pressure, by restricting the opening of the fuel cell bypass valve 38 under abnormal conditions in which the one valve does not function even when the pressure inside the valve opening pressure chamber 52 of the above-described one valve is at the first pressure value. Therefore, even when one of either the humidifier bypass valve 18 or the inlet shutoff valve 20 is stuck, the first pressure value can be changed by increasing the pressure at the first pressure in the valve opening pressure chamber 52 communicating with the air compressor 24 is by restricting the opening of the fuel cell bypass valve 38, and thereby achieve a stable operation. In addition, in order to drive any one of the humidifier bypass valve 18 and the inlet shutoff valve 20, fuel in the fuel cell stack 12 does not need to be consumed, and generated power of the fuel cell stack 12 can be effectively used.

Second Embodiment of the Invention

Figure 7:
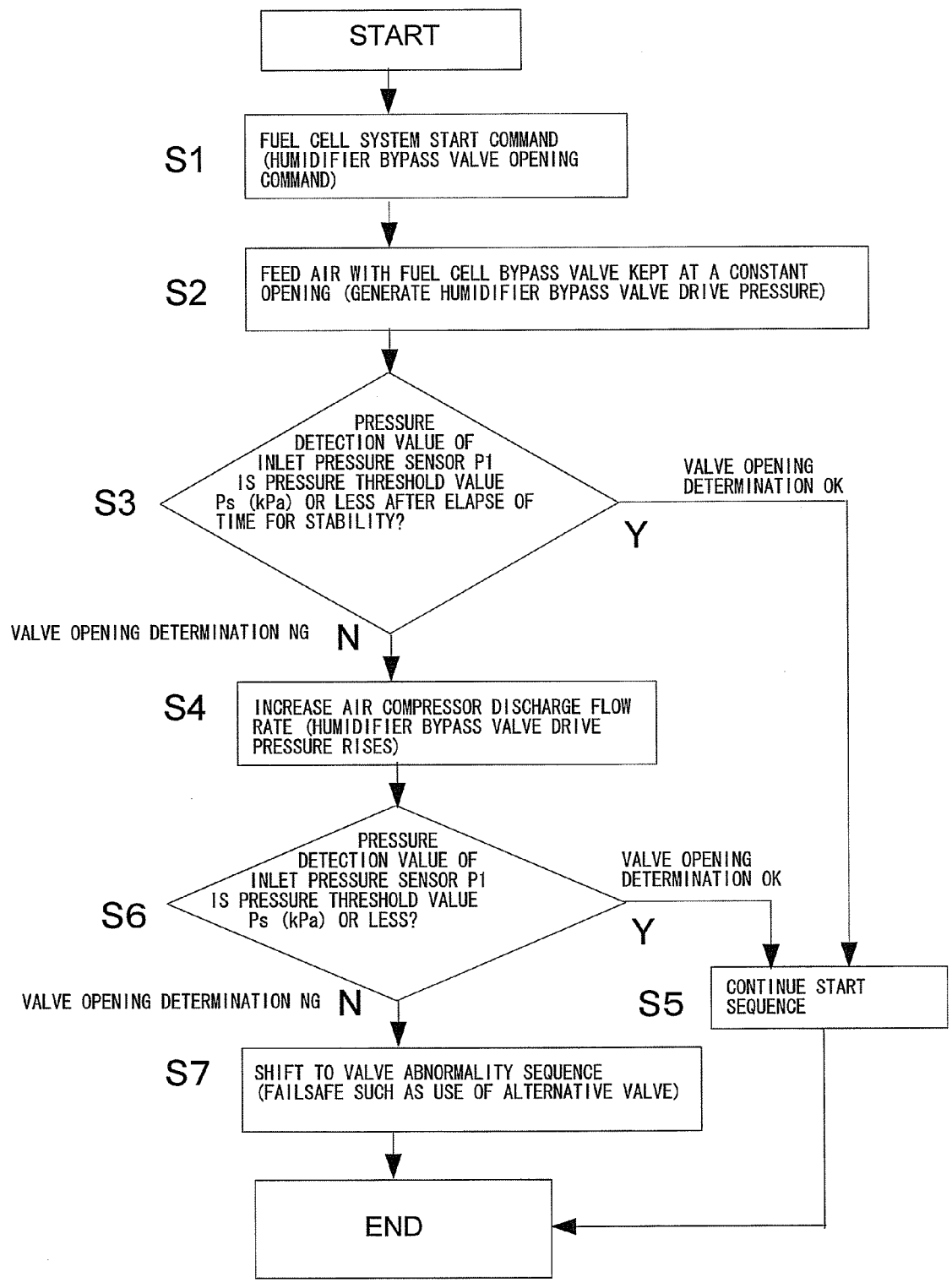
FIG. 7 is a flowchart showing a start control method in the fuel cell system according to a second embodiment of the present invention.

FIG. 7 is a flowchart showing a start control method according to a second embodiment of the present invention. In the following description, the basic configuration of the fuel cell system is the same as that of the first embodiment shown in of FIG. 1, and therefore the same reference numerals and characters as used above will be assigned to portions equivalent to those of the configuration of FIG. 1. First, a start control method when first only the humidifier bypass valve 18 among the humidifier bypass valve 18 and the inlet shutoff valve 20 is opened at the time of start-up of power generation, and thereafter, only the inlet shutoff valve 20 is opened, will be described.

In the case of the present embodiment, there is provided the pressure applying unit which drive one of the humidifier bypass valve 18 and the inlet shutoff valve 20 by causing the pressure at the first pressure value corresponding to the first discharge pressure of the air compressor 24 to act on the valve opening pressure chamber 52 communicating with the air compressor 24 in the one valve of the humidifier bypass valve 18 and the inlet shutoff valve 20. Particularly in the present embodiment, corresponding to the pressure changing unit of the control unit in the first embodiment described above, there is provided air compressor controlling unit which are fluid supply portion controlling unit which change the pressure at the first pressure value in the valve opening pressure chamber 52 of the one valve by increasing the discharge flow rate of the air compressor 24 to the predetermined flow rate instead of restricting the opening of the fuel cell bypass valve 38 under abnormal conditions in which the one valve does not function even when the pressure inside the valve opening pressure chamber 52 of the above-described one valve is at the first pressure value.

Subsequently, in step S3 of FIG. 7, as in the first embodiment shown in FIG. 6, the air compressor controlling unit of the control unit determines whether or not the pressure detection value of the inlet pressure sensor P1 decreases to the pressure threshold value Ps (kPa) or less after a elapse of the time for stability while monitoring the pressure detection value of the inlet pressure sensor P1 located at the outlet of the air compressor 24.

Subsequently, in step S3, when it is determined that the pressure detection value of the inlet pressure sensor P1 does not become the pressure threshold value Ps (kPa) or less after elapse of the time for stability, namely, that the humidifier bypass valve 18 is in the state in which it is not normally opened (the valve opening determination is NG) by the air compressor controlling unit, the air compressor controlling unit increase the discharge flow rate of the air compressor 24 (FIG. 1) by a predetermined flow rate with respect to the present flow rate in step S4, and thereby increase the pressure of the air which is supplied to the valve opening pressure chamber 52 of the humidifier bypass valve 18 to be higher than the first pressure value.

Next, in step S6 the air compressor controlling unit again determine whether or not the pressure detection value of the inlet pressure sensor P1 decreases to become the pressure threshold value Ps (kPa) or less after elapse of a time for stability. When it is determined at the determination in step S6 that the pressure detection value of the inlet pressure sensor P1 does not become the pressure threshold value Ps (kPa) or less, that is, that the humidifier bypass valve 18 has not opened normally (valve opening determination is NG), it is determined that the humidifier bypass valve 18 cannot be opened by increasing the discharge flow rate of the air compressor 24, and in step S7 the flow shifts to the valve abnormality sequence control as in the first embodiment shown in the FIG. 6 described above.

In contrast with this, when after elapse of the time for stability it is determined in step S3 that the pressure detection valve of the inlet pressure sensor P1 becomes the pressure threshold value Ps (kPa) or less, namely, the humidifier bypass valve 18 is in the state in which it is normally opened (the valve opening determination is OK), the start sequence processing is continued in step S5.

Further, when after elapse of the time for stability it is determined in step S6 that the pressure detection valve of the inlet pressure sensor P1 becomes the pressure threshold value Ps (kPa) or less, that is, that the humidifier bypass valve 18 is in the state in which it is normally opened (the valve opening determination is OK), the start sequence processing is also continued in step S5, so that the air discharged from the air compressor 24 is supplied to the fuel cell stack 12 through the humidifier bypass route 32.

In the above description, the case of generating power by first supplying air to the fuel cell stack 12 through only the humidifier bypass route 32, and not through the main route 30, at the time of start of power generation was described. However, the present embodiment is not limited to such a configuration, and can be also employed when air is supplied to the fuel cell stack 12 through the main route 30 by first opening only the inlet shutoff valve 20, and not the humidifier bypass valve 18, at the time of start-up of power generation, as in the above-described first embodiment.

The fuel cell system 10 of the present embodiment as described above includes the air compressor controlling unit as the pressure changing unit which change the pressure at the first pressure value inside the valve opening pressure chamber 52 of one of either the humidifier bypass valve 18 or the inlet shutoff valve 20, namely, increases the pressure value of the pressure inside the valve opening pressure chamber 52 to be larger than the first pressure value, by increasing the discharge flow rate of the air compressor 24 under abnormal conditions in which the one valve does not function even when the pressure inside the valve opening pressure chamber 52 of the one of the humidifier bypass valve 18 and the inlet shutoff valve 20 is at the first pressure value. Therefore, even when one valve out of the humidifier bypass valve 18 and the inlet shutoff valve 20 is locked or stuck, sticking of the one valve can be released by increasing the pressure value of the pressure inside the valve opening pressure chamber 52 which communicates with the air compressor 24 in the one valve by increasing the discharge flow rate of the air compressor 24, and thereby a stable operation can be performed.

As the configuration and operation of the present embodiment are otherwise the same as in the first embodiment shown in the above-described FIGS. 1 to 6, the illustration and description concerning the equivalent portions will not be repeated.

Third Embodiment of the Invention

Although not illustrated, the first embodiment shown in the above-described FIGS. 1 to 6 and the second embodiment shown in the above-described FIG. 7 can be combined as a third embodiment of the present invention. Specifically, the present embodiment will be described hereinafter with use of the reference numerals and characters of FIG. 1 showing the above-described first embodiment; the present embodiment includes the pressure applying unit which cause the pressure at the first pressure value corresponding to the first discharge pressure of the air compressor 24 to act on the valve opening pressure chamber 52 which communicates with the air compressor 24, in one of the humidifier bypass valve 18 and the inlet shutoff valve 20, and thereby drive the above-described one valve, as in each of the embodiments described above. In the present embodiment are employed, corresponding to the pressure changing unit provided to the control unit in the first embodiment as described above, air compressor fuel cell bypass valve control unit which restrict the opening of the fuel cell bypass valve 38 and increase the discharge flow rate of air by the air compressor 24, which is the fluid supply portion under abnormal conditions in which the one valve does not function even when the pressure inside the valve opening pressure chamber 52 of the above-described one valve is at the first pressure value corresponding to the first discharge pressure of the air compressor 24.

In the thus-configured present embodiment as applied to, for example, the configuration of the first embodiment as shown in the above-described FIG. 6, in step S4 the air compressor fuel cell bypass valve control unit increase the discharge flow rate of the air compressor 24 by a predetermined flow rate, and restrict the opening of the fuel cell bypass valve 38 to increase the pressure of the air which is supplied to the valve opening pressure chamber 52 of the humidifier bypass valve 18 or the inlet shutoff valve 20. With such a configuration, even when one of the humidifier bypass valve 18 and the inlet shutoff valve 20 is stuck, that valve can be driven more easily.

The other configurations and operations are the same as those of the first embodiment shown in the above-described FIGS. 1 to 6 or the second embodiment shown in FIG. 7.

Fourth Embodiment of the Invention

Figure 8A:
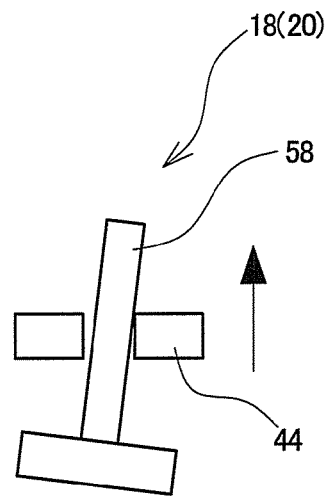
FIG. 8a is a schematic view showing a state in which a valve member inclines with respect to an axial direction of a slide portion and is stuck, which is the problem solved by a fuel cell system according to a fourth embodiment of the present invention.
Figure 8B:
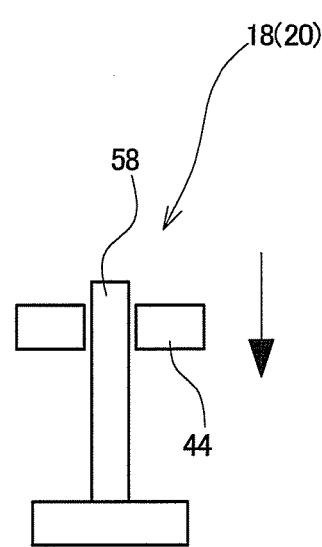
FIG. 8b is a schematic view showing a state in which, in order to release sticking of the valve member to the slide portion, a force is caused to act on the valve member alternately in both directions.
Figure 8C:
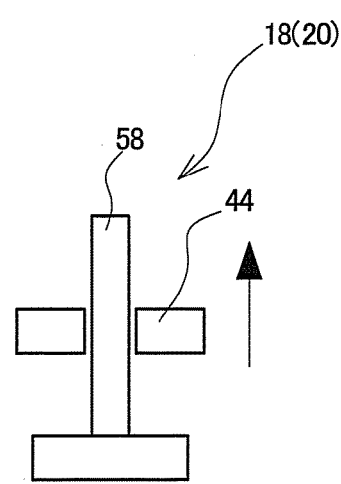
FIG. 8c is a schematic view showing a state in which in order to release sticking of the valve member to the slide portion, a force is caused to act on the valve member alternately in both directions.

FIGS. 8a, 8b, 8c, 9 and 10 show a fourth embodiment of the present invention. In the following description, the basic configuration of the fuel cell system is the same as in the case of FIG. 1 showing the above-described first embodiment, and the equivalent portions to the configuration of FIG. 1 will therefore be assigned with the same reference numerals and characters and their description will not be repeated. FIGS. 8a, 8b and 8c are schematic views showing the problem to be solved by the present embodiment, and the principle which solves the problem. More specifically, FIGS. 8a, 8b and 8c show the relationship of the valve member 58 and the hole portion provided in the partitioning portion 44, which is a slide portion which slides the valve member 58 in the humidifier bypass valve 18 or the inlet shutoff valve 20. The problem solved by the present embodiment is that, in FIG. 8a, in the humidifier bypass valve 18 or the inlet shutoff valve 20, the valve member 58 is caught by the corner portion or the like of the hole portion in the state in which the valve member 58 inclines with respect to the axial direction of the hole portion provided in the partitioning portion 44, and is stuck in a state in which the valve is not fully open. When the valve member 58 is stuck to the hole portion in such a manner, providing the normal opening pressure to the valve opening pressure chamber 52 of the humidifier bypass valve 18 or the inlet shutoff valve 20, as in the case in which the valve member 58 is stuck to the fixed portion by freezing, is unlikely to cause either the humidifier bypass valve 18 or the inlet shutoff valve 20 to open completely.

In order to solve this problem, in the present embodiment, the control unit such as the ECU includes pressure applying unit which drive one of either the humidifier bypass valve 18 or the inlet shutoff valve 20 by causing the pressure at the first pressure value to act on the valve opening pressure chamber 52 which communicates with the air compressor 24 (FIG. 1) in one of the humidifier bypass valve 18 and the inlet shutoff valve 20, as in each of the above-described embodiments. In addition, the control unit has a second air compressor control unit which are pressure changing unit which change the pressure inside the valve opening pressure chamber 52 of that one valve, in other words, alternately raise and lower the pressure, under abnormal conditions in which the one valve does not function even when the pressure inside the valve opening pressure chamber 52 of the one valve is at the first pressure value. The second air compressor control unit alternately raises and lowers the supply pressure of air which is supplied to the valve opening pressure chamber 52 of the above-described one valve by the air compressor 24. For this configuration, the second air compressor control unit change the discharge flow rate of the air compressor 24 so as to in pulses or predetermined intervals to repeatedly raise and lower the flow rate.

Figure 9:
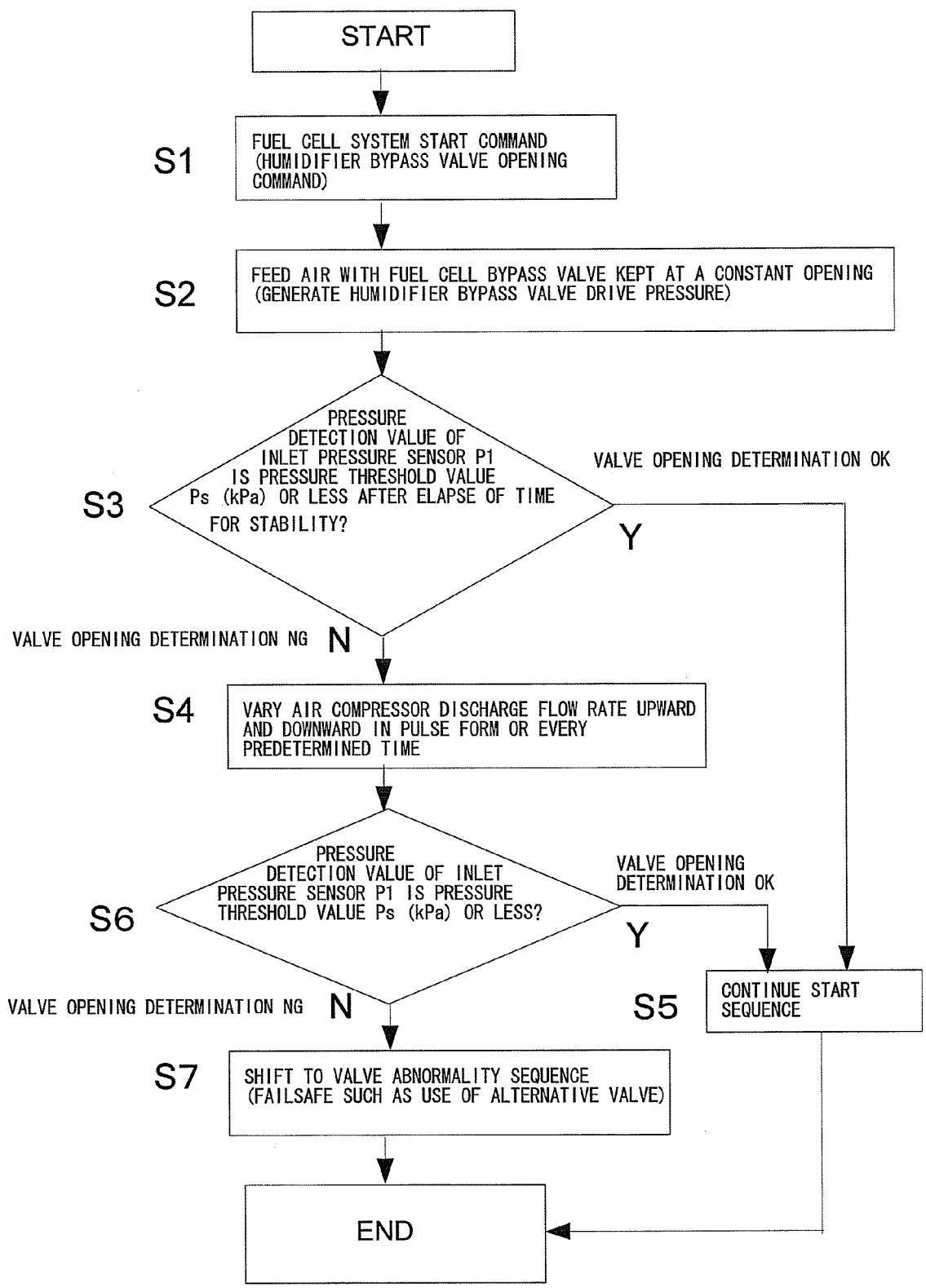
FIG. 9 is a flowchart showing a start control method in the fuel cell system according to the fourth embodiment of the present invention.
Figure 10:
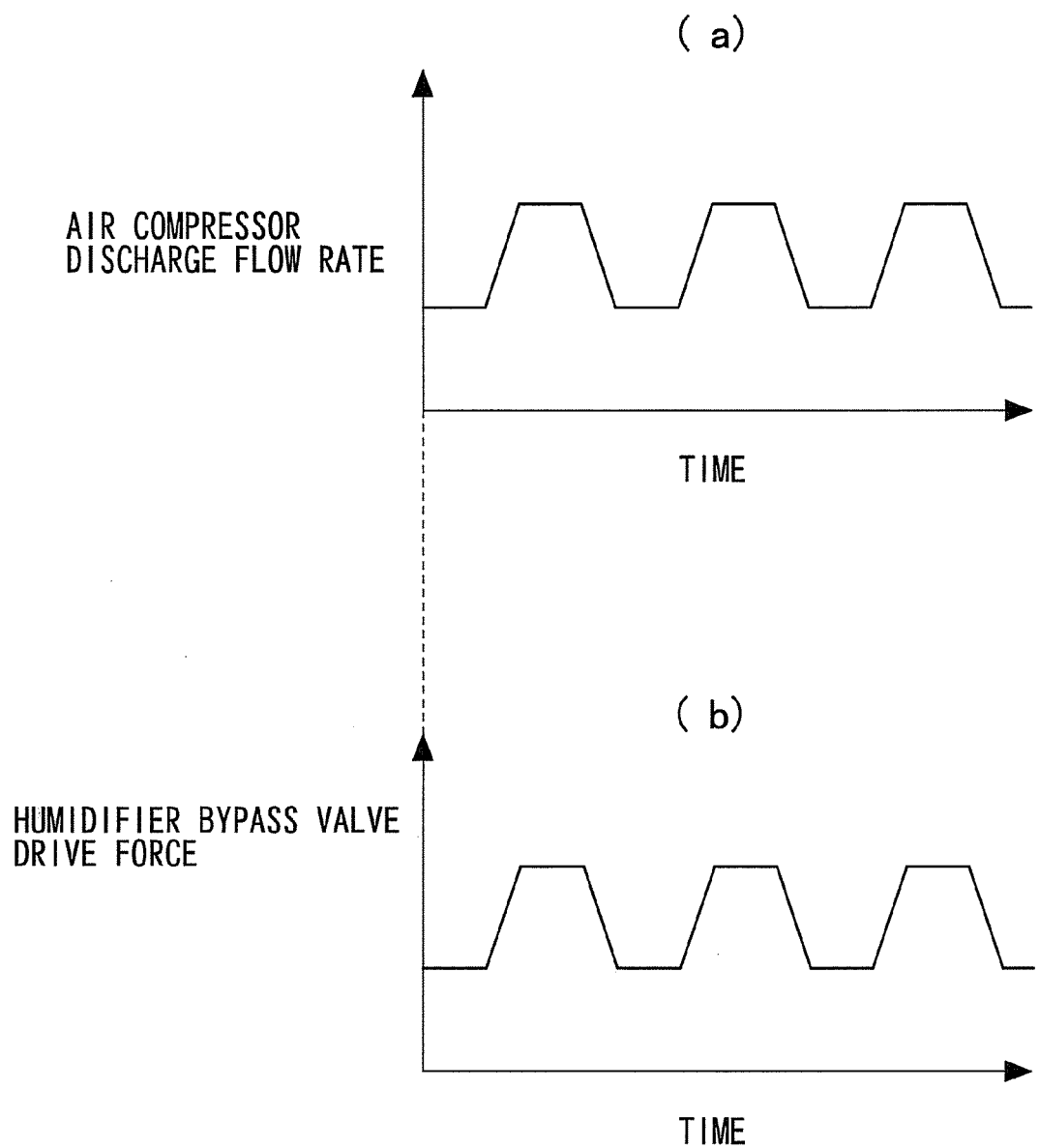
FIG. 10 are FIG. 10(a) show change over time of a discharge flow rate of an air compressor in step S4 of FIGS. 9, and 10(b) shows change over time of valve drive power acting on the valve member of a humidifier bypass valve.

Next, with use of the flowchart of FIG. 9, a start-up processing method according to the present embodiment will be described in more detail. FIG. 9 shows a start control method when first only the humidifier bypass valve 18 is opened and the inlet shutoff valve 20 is not opened, at the time of starting of power generation. When air is supplied to the fuel cell stack 12 during start-up according to the present embodiment, when a start command is sent to the fuel cell system 10 by turning on the ignition key, or the like, the pressure applying unit of the control unit output the command signal for performing opening and closing control of VbS, VbC and VbO so as to open the humidifier bypass valve 18 as in the first embodiment shown in the above-described FIG. 6, on the basis of the valve opening command for the humidifier bypass valve 18, first in step S1.

Next, in step S2, the pressure applying unit operate the air compressor 24 by opening the fuel cell bypass valve 38 a fixed opening, such as half open (50%), and feed compressed air. Subsequently, in step S3, as in the first embodiment shown in the above-described FIG. 6, the second air compressor control unit of the control unit determines whether or not the pressure detection value of the inlet pressure sensor P1 becomes the pressure threshold value Ps (kPa) or less after a predetermined time for stability, while monitoring the pressure detection value of the inlet pressure sensor P1 which is located at the outlet of the air compressor 24.

Subsequently, in step S3, when the second air compressor control unit determine that the pressure detection value of the inlet pressure sensor P1 does not become threshold value Ps (kPa) or less after the predetermined time for stability has elapsed, namely, that the humidifier bypass valve 18 is in the state in which the humidifier bypass valve 18 is not completely open as normal (the valve opening determination is NG), in step S4 the second air compressor control unit change the discharge flow rate of the air compressor 24 so as to repeatedly increase and decrease the flow rate in pulses or intervals. FIG. 10(a) shows the change over time in one example in which the discharge flow rate of the air compressor 24 is made to alternately increase and decrease at predetermined intervals. In correspondence with this, the drive force for the humidifier bypass valve 18, which is the drive force acting on the valve member 58 of the humidifier bypass valve 18, also changes to repeatedly increase and decrease during each predetermined interval.

Next, returning to FIG. 9, in step S6 the second air compressor control unit again determines whether or not the pressure detection value of the inlet pressure sensor P1 becomes the pressure threshold value Ps (kPa) or less after elapse of the predetermined time. When it is determined at the determination in step S6 that the pressure detection value of the inlet pressure sensor P1 has not become the pressure threshold value Ps (kPa) or less, namely, that the humidifier bypass valve 18 is in a state in which it is not open as normal (the valve opening determination is NG), it is determined that the humidifier bypass valve 18 cannot be completely opened with the control which changes the discharge flow rate of the air compressor 24, and, as in the first embodiment shown in the above-described FIG. 6, the process shifts to the valve abnormality sequence control in step S7.

In contrast with this, when it is determined in step S3 after elapse of the predetermined time for stability that the pressure detection value of the inlet pressure sensor P1 has become the pressure threshold value Ps (kPa) or less, in other words, that the humidifier bypass valve 18 is in a normal open state (the valve opening determination is OK), the start sequence processing continues on to step S5.

Further, the start sequence processing also continues on to step S5 when it is determined in step 6 that the pressure detection value of the inlet pressure sensor P1 has become pressure threshold value Ps (kPa) or less after elapse of the predetermined time for stability, that is, that the humidifier bypass valve 18 is in a normal open state (the valve opening determination is OK), and the air discharged from the air compressor 24 is then supplied to the fuel cell stack 12 through the humidifier bypass route 32.

In the above example, a case wherein power generation is begun by supplying air to the fuel cell stack 12 first through only the humidifier bypass route 32 out of the humidifier bypass route 32 and the main route 30 at the time of start of power generation was described. However, the present embodiment is not limited to such a case, but also can be applied in situations where air is supplied to the fuel cell stack 12 through the main route 30 during start-up by first opening only the inlet shutoff valve 20 out of the inlet shutoff valve 20 and the humidifier bypass valve 18, as in the first embodiment shown in the above-described FIGS. 1 to 6.

The fuel cell system 10 of the present embodiment as described above includes the pressure applying unit which cause the pressure at the first pressure value to act on the valve opening pressure chamber 52 which communicates with the air compressor 24 in one of either the humidifier bypass valve 18 or the inlet shutoff valve 20 and thereby drive that one valve, and the second air compressor control unit that are the pressure changing unit which change the pressure at the first pressure value inside the valve opening pressure chamber 52 of the one valve, that is, alternately increase and decrease the discharge flow rate of the air compressor 24, under abnormal conditions in which the one valve does not function even when the pressure inside the valve opening pressure chamber 52 of the above-described one valve is at the first pressure value. Therefore, even when the drive shaft 60 (see FIGS. 2 and 3) of the valve member 58 of the above-described one valve catches on fixed portion of the valve as a result of the drive shaft 60 inclining with respect to the hole portion of the partitioning portion 44, which is a slide portion, and the valve sticks and cannot be made to function by only causing the normal pressure for driving the valve to act on the valve opening pressure chamber 52, the force can be caused to act on the valve member 58 on one side in the axial direction and the other side in the axial direction alternately by pressure variation. Therefore, locking of the valve is released and the valve can be driven.

More specifically, even when catching of a moving part on the valve member 58 cannot be released by only applying a force to the valve member 58 in one direction, the valve can be unstuck by causing a force to act on the valve member 58 alternately in both the upper and lower direction by upward and downward change of the discharge flow rate of the air compressor 24 as shown in FIGS. 8*b* and 8*c*. As a result, inclination of the valve member 58 with respect to the sliding portion is corrected ,and the valve can be smoothly operated. Thereby, stable operation can be obtained. In addition, the fuel in the fuel cell stack 12 does not need to be consumed to drive any one of the humidifier bypass valve 18 and the inlet shutoff valve 20, and the generated power of the fuel cell stack 12 can be used more effectively.

Except as described, the configuration and operation of the present embodiment are the same as in the first embodiment shown in the above-described FIGS. 1 to 6.

Fifth Embodiment of the Invention

Although not illustrated, according to a fifth embodiment of the present invention, the second fuel cell bypass valve control unit can be used as the pressure changing unit which increase and decrease alternately the pressure value of the pressure inside the valve opening pressure chamber 52 of one valve of the inlet shutoff valve 20 and the humidifier bypass valve 18 under abnormal conditions in which the one valve does not function, even when the pressure inside the valve opening pressure chamber 52 of the one valve among the inlet shutoff valve 20 and the humidifier bypass valve 18 is at the first pressure value in the fourth embodiment shown in the above-described FIGS. 8*a*, 8*b*, 8*c*, 9 and 10. Here, when abnormal conditions as described above occur, the second fuel cell bypass valve control unit changes the opening of the humidifier bypass valve 18 so that the opening becomes alternately larger and smaller. When such second fuel cell bypass valve control unit is employed, a force can be caused to act alternately on both sides of the valve member 58 (see FIGS. 8*a*, 8*b* and 8*c*), and the valve can be smoothly driven by releasing locking to the fixed portion due to catch of the valve member 58 or the like, thereby achieving, as in the above-described fourth embodiment, stable operation.

The invention claimed is:

1. A fuel cell system, comprising:
   a fuel cell generating electric power through an electrochemical reaction of an oxidized gas and a fuel gas;
   a valve functioning in accordance with pressure change of a fluid supplied from a fluid supply section to a pressure chamber of the valve;
   a pressure applying unit programmed to drive the valve by supplying a fluid having a first pressure value from the fluid supply section to the pressure chamber;
   a pressure changing unit programmed to change a pressure inside the pressure chamber to be at a pressure value that is different from the first pressure value under abnormal conditions in which the valve does not function even when the pressure inside the pressure chamber is at the first pressure value;
   an oxidized gas supply flow path supplying the oxidized gas to the fuel cell;
   an oxidized gas related exhaust flow path exhausting the oxidized gas related gas from the fuel cell;
   a fuel cell bypass flow path connecting the oxidized gas supply flow path and the oxidized gas related exhaust flow path and bypassing the fuel cell; and
   a fuel cell bypass valve provided in the fuel cell bypass flow path,
   wherein the pressure changing unit is a fuel cell bypass valve control unit programmed to open the fuel cell bypass valve a predetermined amount at a starting time, and increase a pressure value of a fluid to be supplied to the pressure chamber to be larger than the first pressure value by restricting an opening of the fuel cell bypass valve under abnormal conditions in which the valve does not function even when the pressure inside the pressure chamber is at the first pressure value.

2. The fuel cell system according to claim 1,
   wherein the pressure changing unit is a fluid supply section controlling unit programmed to increase the supply pressure of the fluid to be supplied to the pressure chamber by the fluid supply section to a pressure greater than the first pressure value.

3. The fuel cell system according to claim 1, further comprising:
   an oxidized gas supply flow path supplying the oxidized gas to the fuel cell;
   an oxidized gas related exhaust flow path exhausting the oxidized gas related gas from the fuel cell;
   a fuel cell bypass flow path connecting the oxidized gas supply flow path and the oxidized gas related exhaust flow path and bypassing the fuel cell; and
   a fuel cell bypass valve provided in the fuel cell bypass flow path,
   wherein the pressure changing unit is a fluid supply section fuel cell bypass valve controlling unit programmed to open the fuel cell bypass valve by a predetermined amount at a starting time, restrict an opening of the fuel cell bypass valve, and increase a discharge flow rate of a fluid by the fluid supply section when abnormal conditions in which the valve does not function even when the pressure inside the pressure chamber is at the first pressure value.

4. The fuel cell system according to claim 1,
   wherein the pressure changing unit is programmed to alternately raise and lower the pressure in the pressure chamber under abnormal conditions in which the valve does not function even when the pressure inside the pressure chamber is at the first pressure value.

5. The fuel cell system according to claim 4,
   wherein the pressure changing unit is a fluid supply section controlling unit programmed to alternately raise and lower the supply pressure of a fluid to be supplied to the pressure chamber by the fluid supply section.

\* \* \* \* \*

UNITED STATES PATENT AND TRADEMARK OFFICE
CERTIFICATE OF CORRECTION

PATENT NO.        : 8,642,194 B2                                    Page 1 of 1
APPLICATION NO. : 12/523939
DATED             : February 4, 2014
INVENTOR(S)       : Osada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this

Twenty-ninth Day of September, 2015

Michelle K. Lee
*Director of the United States Patent and Trademark Office*